United States Patent
Jang et al.

(10) Patent No.: US 9,875,038 B2
(45) Date of Patent: Jan. 23, 2018

(54) STORAGE DEVICE INCLUDING NONVOLATILE MEMORY DEVICE

(71) Applicant: SAMSUNG ELECTRONICS CO., LTD., Suwon-si (KR)

(72) Inventors: Dae-Hoon Jang, Seoul (KR); Bomi Kim, Hwaseong-si (KR); Songho Yoon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 73 days.

(21) Appl. No.: 15/083,524

(22) Filed: Mar. 29, 2016

(65) Prior Publication Data
US 2016/0378359 A1 Dec. 29, 2016

(30) Foreign Application Priority Data
Jun. 24, 2015 (KR) .................. 10-2015-0090056

(51) Int. Cl.
G06F 3/06 (2006.01)
G06F 12/02 (2006.01)

(52) U.S. Cl.
CPC .......... *G06F 3/0613* (2013.01); *G06F 3/0659* (2013.01); *G06F 3/0685* (2013.01); *G06F 12/0246* (2013.01); *G06F 2212/1024* (2013.01); *G06F 2212/2022* (2013.01); *G06F 2212/60* (2013.01); *G06F 2212/7201* (2013.01); *G06F 2212/7203* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 6,098,150 | A | 8/2000 | Brethour et al. |
| 7,051,184 | B2 | 5/2006 | Lane |
| 7,203,790 | B2 | 4/2007 | Denneau et al. |
| 7,679,133 | B2 | 3/2010 | Son et al. |
| 8,386,698 | B2 | 2/2013 | Yeh |
| 8,489,850 | B2 | 7/2013 | Kaneko et al. |
| 8,553,466 | B2 | 10/2013 | Han et al. |
| 8,559,235 | B2 | 10/2013 | Yoon et al. |
| 8,654,587 | B2 | 2/2014 | Yoon et al. |
| 2004/0225859 | A1 | 11/2004 | Lane |
| 2005/0273545 | A1 | 12/2005 | Denneau et al. |
| 2007/0150693 | A1 | 6/2007 | Kaneko et al. |
| 2009/0121271 | A1 | 5/2009 | Son et al. |

(Continued)

FOREIGN PATENT DOCUMENTS

| | | |
|---|---|---|
| JP | H 6-314233 A | 11/1994 |
| JP | H 10-105466 A | 4/1998 |

(Continued)

*Primary Examiner* — Kevin Verbrugge
(74) *Attorney, Agent, or Firm* — Sughrue Mion, PLLC

(57) ABSTRACT

A storage device including a nonvolatile memory device is provided. The storage device may include: a nonvolatile memory device; and a controller configured to control a read operation of the nonvolatile memory device according to a read request from an external host device. The controller is configured to read map data including a segment, and to store different types of map data in an internal random access memory (RAM) based on determining whether the segment corresponds to sequential data.

20 Claims, 20 Drawing Sheets

(56) References Cited

U.S. PATENT DOCUMENTS

| | | |
|---|---|---|
| 2010/0011154 A1 | 1/2010 | Yeh |
| 2011/0216603 A1 | 9/2011 | Han et al. |
| 2011/0233648 A1 | 9/2011 | Seol et al. |
| 2012/0051143 A1 | 3/2012 | Yoon et al. |
| 2013/0279262 A1 | 10/2013 | Yoon et al. |
| 2014/0281229 A1 | 9/2014 | Kowles |
| 2014/0281315 A1 | 9/2014 | Danilak et al. |
| 2015/0143028 A1* | 5/2015 | Jung .................. G06F 12/0246 711/103 |

FOREIGN PATENT DOCUMENTS

| | | |
|---|---|---|
| JP | H 11-143644 A | 5/1999 |
| KR | 101226600 B1 | 1/2013 |

* cited by examiner

| L1W1 | | |
|---|---|---|
| Segment | PBA | Index |
| S1_1 | | |
| S1_2 | | |
| ⋮ | | |
| S1_J | | |

| L1W2 | | |
|---|---|---|
| Segment | PBA | Index |
| S1_1 | | |
| S1_2 | | |
| ⋮ | | |
| S1_J | | |

| L2W1 | | |
|---|---|---|
| Segment | PBA | Index |
| S2_1 | | |
| S2_2 | | |
| ⋮ | | |
| S2_M | | |

| L2W2 | | |
|---|---|---|
| Segment | PBA | Index |
| S2_1 | | |
| S2_2 | | |
| ⋮ | | |
| S2_M | | |

| L1W1 | | |
|---|---|---|
| Segment | PBA | Index |
| S1_1 | | |
| S1_2 | | |

| L1W2 | | |
|---|---|---|
| Segment | PBA | Index |
| S1_1 | | |
| S1_2 | | |

| L2W1 | | |
|---|---|---|
| Segment | PBA | Index |
| S2_1 | PBA1 | SET_1 |
| S2_2 | | |
| S2_3 | | |
| S2_4 | | |

| L2W2 | | |
|---|---|---|
| Segment | PBA | Index |
| S2_1 | | |
| S2_2 | | |
| S2_3 | | |
| S2_4 | | |

| L1W1 | | |
|---|---|---|
| Segment | PBA | Index |
| S1_1 | PBA2 | SET_3 |
| S1_2 | | |

| L1W2 | | |
|---|---|---|
| Segment | PBA | Index |
| S1_1 | | |
| S1_2 | | |

| L2W1 | | |
|---|---|---|
| Segment | PBA | Index |
| S2_1 | PBA1 | SET_1 |
| S2_2 | | |
| S2_3 | | |
| S2_4 | | |

| L2W2 | | |
|---|---|---|
| Segment | PBA | Index |
| S2_1 | | |
| S2_2 | | |
| S2_3 | | |
| S2_4 | | |

| L1W1 | | |
|---|---|---|
| Segment | PBA | Index |
| S1_1 | PBA2 | SET_3 |
| S1_2 | PBA4 | SET_4 |

| L1W2 | | |
|---|---|---|
| Segment | PBA | Index |
| S1_1 | | |
| S1_2 | | |

| L2W1 | | |
|---|---|---|
| Segment | PBA | Index |
| S2_1 | PBA1 | SET_1 |
| S2_2 | | |
| S2_3 | | |
| S2_4 | | |

| L2W2 | | |
|---|---|---|
| Segment | PBA | Index |
| S2_1 | PBA3 | SET_2 |
| S2_2 | | |
| S2_3 | | |
| S2_4 | | |

STORAGE DEVICE INCLUDING NONVOLATILE MEMORY DEVICE

CROSS-REFERENCE TO RELATED APPLICATIONS

This application claims from Korean Patent Application No. 10-2015-0090056, filed Jun. 24, 2015, in the Korean Intellectual Property Office, the entire disclosure of which is incorporated herein by reference.

BACKGROUND

Apparatuses and methods consistent with exemplary embodiments relate to a semiconductor circuit, and more particular, to a storage device including a nonvolatile memory device.

A storage device is a device that stores data according to control of a host device, such as a computer, a smartphone, a smart pad, or the like. The storage device includes a device (e.g., hard disk drive (HDD)), which stores data on a magnetic disk, or a semiconductor memory, such as solid state drive (SSD) or memory card, which stores data on a nonvolatile memory.

A nonvolatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), or a ferroelectric RAM (FRAM).

With the advancement of the semiconductor fabrication technology, an operating speed of a host device, communicating with the storage device, such as a computer, a smartphone, a smart pad, or the like is being improved. In addition, the capacity of contents which the storage device and the host device of the storage device use is being increased. For this reason, it is necessary to further improve the operating speed of the storage device.

SUMMARY

One or more exemplary embodiments provide a storage device with an improved speed.

According to an aspect of an exemplary embodiment, there is provided a storage device including a nonvolatile memory device; and a controller configured to control a read operation of the nonvolatile memory device according to a read request from an external host device, wherein the controller is configured to read map data including a segment, and to store different types of map data in an internal random access memory (RAM) based on determining whether the segment corresponds to sequential data.

The controller is configured to receive the read request based on logical addresses, convert the logical addresses into physical addresses of the nonvolatile memory device, and control the read operation based on the converted physical addresses.

The controller is configured to read the map data including the segment corresponding to the logical addresses.

The controller is configured to store cache map data indicating that the segment corresponds to the sequential data, if the segment corresponds to the sequential data, and store partial map data, associated with the logical addresses and the physical addresses, among the map data, if the segment does not correspond to the sequential data.

The cache map data comprises information about a start physical address of the segment and a start logical address related to the start physical address.

The controller is configured to convert, if cache map data corresponding to the logical addresses is stored in the internal RAM, the logical addresses into the physical addresses using the cache map data stored in the internal RAM.

The controller is configured to determine whether cache map data corresponding to the logical addresses is stored in the internal RAM based on a set associative cache.

The controller is configured to store, in the internal RAM, cache map data indicating that a first segment corresponding to the logical addresses corresponds to sequential data, if the first segment corresponds to the sequential data and to store cache map data indicating that a second segment which is smaller than the first segment and corresponds to the logical addresses corresponds to sequential data, if the first segment does not correspond to sequential data and the second segment corresponds to sequential data.

A size of the first segment and a size of the second segment are determined according to operating characteristics of the controller and the nonvolatile memory device.

A size of the first segment and a size of the second segment are determined according to operating characteristics of the controller and the external host device.

The segment comprises a plurality of entries, and each of the plurality of entries comprises conversion information between a logical address and a physical address.

The cache map data comprises a start entry of the segment, and the partial map data comprises entries corresponding to the logical addresses.

The start entry further comprises a cache tag indicating that the segment corresponds to sequential data.

The nonvolatile memory device comprises a plurality of memory blocks, each of the plurality of memory blocks comprises a plurality of cell strings arranged on a substrate, each of the plurality of cell strings comprises at least one selection transistor and a plurality of memory cells stacked on the substrate in a direction perpendicular to the substrate, and each of the at least one selection transistor and the plurality of memory cells comprises a charge trap layer.

According to an aspect of another exemplary embodiment, there is provided a storage device including a nonvolatile memory device; and a controller configured to control a write operation of the nonvolatile memory device according to a write request from an external host device, wherein the controller is configured to generate map data, to store the generated map data as different types of map data in an internal random access memory (RAM) based on determining whether a segment corresponds to sequential data, and to write the generated map data and write data corresponding to the write request in the nonvolatile memory device.

The controller is configured to receive the write request based on logical addresses, convert the logical addresses into physical addresses of the nonvolatile memory device, and control the write operation based on the converted physical addresses.

The controller is configured to generate the map data including conversion information between the logical addresses and the physical addresses.

The controller is configured to store cache map data indicating that the segment corresponds to the sequential data, if a range in which the logical addresses are continuous is greater than or equal to the segment, and store the generated map data as partial map data, if a range in which the logical addresses are continuous is smaller than the segment.

If a read request based on logical addresses corresponding to the segment is received from the external host device, the controller is configured to convert the logical addresses into the physical addresses using the cache map data.

If a range in which the logical addresses are continuous is greater than or equal to the segment, the controller is configured to add a cache tag indicating that the segment corresponds to sequential data, to the generated map data.

if a range in which the logical addresses are continuous is greater than or equal to the segment and smaller than a second segment greater than the segment, the controller is configured to read map data of the second segment corresponding to the logical addresses, to update map data of the second segment, and to write the updated map data in the nonvolatile memory device.

The nonvolatile memory device comprises a three-dimensional (3D) memory array.

The 3D memory array comprises a plurality of memory cells, and each of the plurality of memory cells comprises a charge trap layer.

The 3D memory array comprises a plurality of memory strings

According to an aspect of another exemplary embodiment, there is provided a method of operating a storage device which includes a nonvolatile memory device and a controller configured to control the nonvolatile memory device, the method including receiving a write request from an external host device; generating map data for associating logical addresses corresponding to the write request with physical addresses of the nonvolatile memory device; and generating cache map data corresponding to at least one segment if a range in which the logical addresses are continuous is greater than or equal to the at least one segment.

The method further including storing the cache map data in an internal random access memory (RAM) of the controller, if a range in which the logical addresses are continuous is greater than or equal to the at least one segment; and storing the generated map data as partial map data in the internal RAM of the controller, if a range in which the logical addresses are continuous is smaller than the at least one segment.

According to an aspect of another exemplary embodiment, there is provided a storage device including a nonvolatile memory device; and a controller configured to receive a write request from an external host device, generate map data for associating logical addresses corresponding to the write request with physical addresses of the nonvolatile memory device, generate cache map data corresponding to at least one segment if a range in which the logical addresses are continuous is greater than or equal to the at least one segment, and write the generated map data and write data corresponding to the write request in the nonvolatile memory device.

The controller is configured to store the cache map data in an internal random access memory (RAM) of the controller, if a range in which the logical addresses are continuous is greater than or equal to the at least one segment, and store the generated map data as partial map data in the internal RAM of the controller, if a range in which the logical addresses are continuous is smaller than the at least one segment.

BRIEF DESCRIPTION OF THE DRAWINGS

The above and/or other aspects will become apparent from the following description with reference to the following drawings, in which:

FIGS. 4 to 6 show examples in which a controller manages map data based on cache algorithm;

FIGS. 9 to 14 show examples in which sequential data is written in a storage device and cache map data is registered;

DETAILED DESCRIPTION OF THE EXEMPLARY EMBODIMENTS

Exemplary embodiments will be described clearly and in detail with reference to accompanying drawings.

Figure 1:
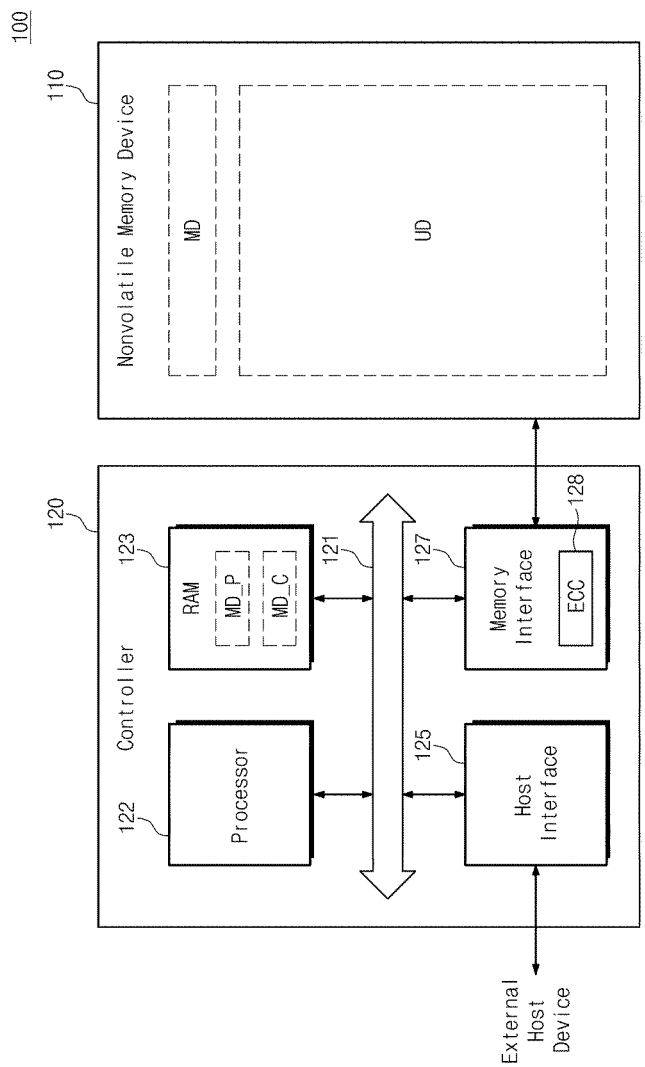
FIG. 1 is a block diagram schematically illustrating a storage device according to an exemplary embodiment.

FIG. 1 is a block diagram schematically illustrating a storage device 100 according to an exemplary embodiment. Referring to FIG. 1, a storage device 100 may include a nonvolatile memory device 110 and a controller 120.

The nonvolatile memory device 110 may perform writing, reading and erasing according to control of the controller 120.

The controller 120 may control the nonvolatile memory device 110 based on a request of an external host device or an internal schedule. The controller 120 may include a bus 121, a processor 122, a random access memory (RAM) 123, a host interface 125, and a memory interface 128.

The bus 121 may be configured to provide a channel among components of the controller 120.

The processor 122 may control an overall operation of the controller 120 and execute a logical operation. The processor 122 may communicate with the external host device through the host interface 125 and communicate with the nonvolatile memory device 110 through the memory interface 127. The processor 122 may control the storage device 100 using the RAM 123 as a working memory, a cache memory, or a buffer memory.

The RAM 123 may be used as a working memory, a cache memory, or a buffer memory of the processor 122. The RAM 123 may store codes or commands that the processor 122 will execute. The RAM 123 may store data processed by the processor 122. The RAM 123 may include a static RAM (SRAM).

The host interface 125 may communicate with the external host device under control of the processor 122. The host interface 125 may communicate with the external host device using at least one of various communication manners, such as a universal serial bus (USB), a serial AT attachment (SATA), a high speed interchip (HSIC), a small computer system interface (SCSI), Firewire, a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), a load reduced DIMM (LRDIMM), and the like.

The memory interface 127 may communicate with the nonvolatile memory 110 according to control of the processor 122. The memory interface 127 may convey a command, an address, and data to the nonvolatile memory device 110 through an input/output channel. The memory interface 127 may convey a control signal to the nonvolatile memory device 110 through a control channel.

The memory interface 127 may include an error correction code (ECC) block 128. The ECC block 128 may perform an error correction operation. The ECC block 128 may perform an error correction encoding based on data to be written at the nonvolatile memory 110 through the memory interface 127. The ECC block 128 may perform an error correction decoding with respect to data received from the nonvolatile memory device 110.

The external host device may assign logical addresses to storage spaces of the storage device 100. The controller 120 may receive a write request which is based on logical addresses, from the external host device. The controller 120 may generate map data MD for converting the logical addresses into physical addresses of the nonvolatile memory device 110. The controller 120 may write the map data MD and write-requested user data UD in the nonvolatile memory device 110. The controller 120 may receive a read request which is based on logical addresses, from the external host device. The controller 120 may convert the logical addresses into physical addresses using the map data MD. Based on the logical addresses, the controller 120 may read user data UD from the nonvolatile memory device 110 and output the read user data UD to the external host device.

As described above, when accessing the nonvolatile memory device 110 according to a request of the external host device, the controller 120 may use the map data MD. The map data MD may include information indicating whether logical addresses assigned by the external host device correspond to any ones of physical addresses of the nonvolatile memory device 110. This may mean that as a storage space of the nonvolatile memory device 110 increases, the size of the map data MD may increase.

For an embedded storage device, such as an embedded multimedia card (eMMC) or universal flash storage (UFS), the capacity of the RAM 123 in the controller 120 may be restricted. For example, the capacity of the RAM 123 may be smaller than the size of map data MD, so the whole map data MD may not be loaded on the RAM 123. For this reason, the controller 120 may be configured to load a part, associated with a previous or current write or read request, among the map data MD on the RAM 123.

The controller 120 of the storage device 100 according to an exemplary embodiment may be configured to load, on the RAM 123, cache map data MD_C, which includes information of map data MD corresponding to sequential data, and partial map data MD_P, which is map data not corresponding to sequential data. The cache map data MD_C may have the form in which the map data MD corresponding to sequential data is condensed and support conversion between logical addresses, corresponding to sequential data, and physical addresses with a small capacity. The partial map data MD_P may be a part, loaded on the RAM 123, among map data MD not corresponding to sequential data.

If the cache map data MD_C is used, the controller 120 may perform conversion between the logical addresses and physical addresses within a greater range using the capacity of the RAM 123 than when the partial map data MD_P is used, and thus, the number of events that the map data MD is read from the nonvolatile memory device 110 may decrease. This may mean that an operating speed of the storage device 100 is improved. Furthermore, if the partial map data MD_P is used together with the cache map data MD_C complementarily, it may be possible to support conversion between logical addresses, corresponding to random data not corresponding to sequential data, and physical addresses.

Figure 2:
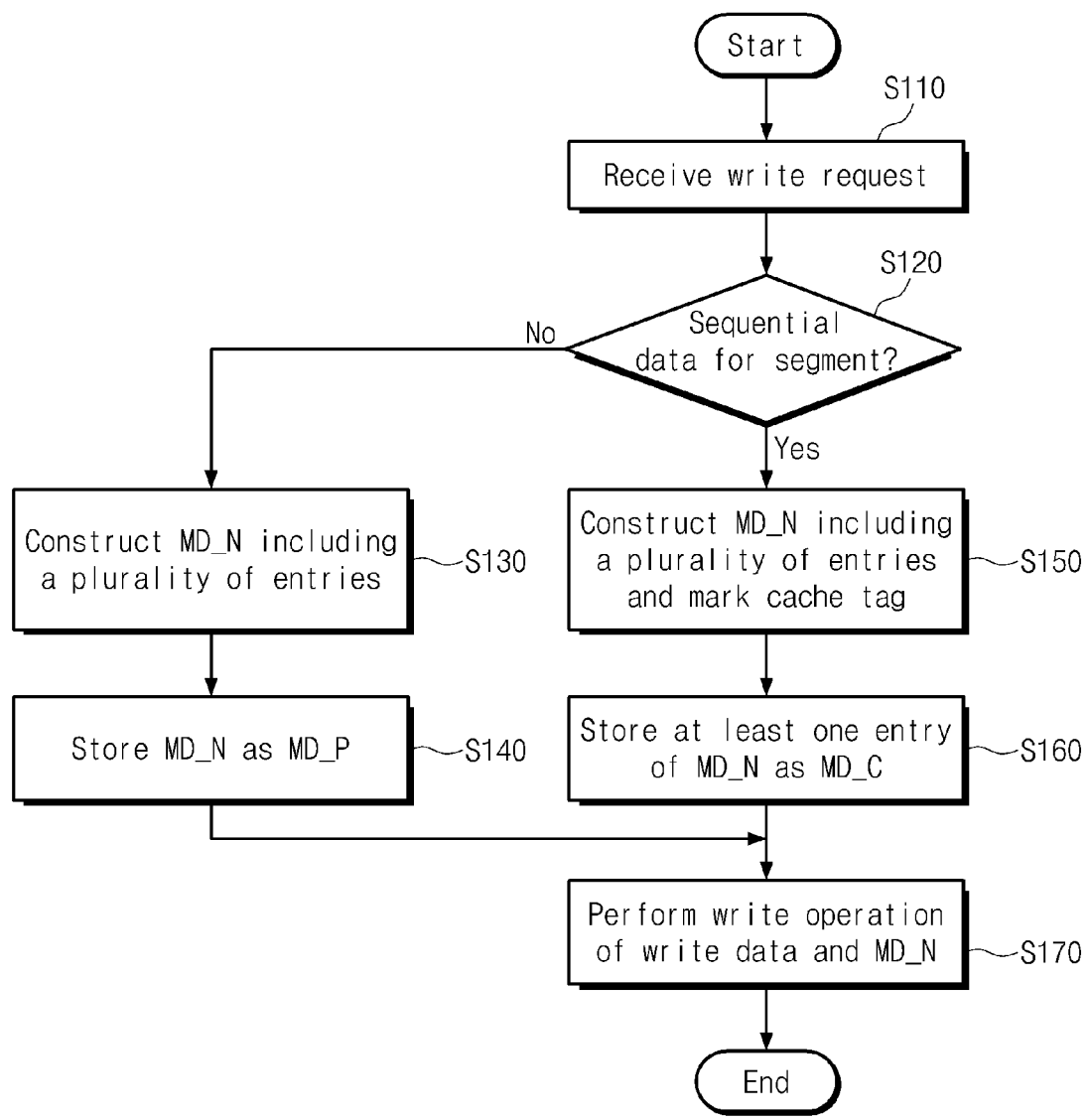
FIG. 2 is a flow chart schematically illustrating an operating method of a storage device according to an exemplary embodiment.

FIG. 2 is a flow chart schematically illustrating an operating method of a storage device 100 according to an exemplary embodiment. In FIG. 2, there is illustrated a method in which the storage device 100 performs a write operation according to a write request of an external host device.

Referring to FIGS. 1 and 2, in step S110, the controller 120 may receive a write request from an external host device. For example, the write request may include logical addresses and write data.

In step S120, the controller 120 may determine whether the write data is sequential data corresponding to at least one segment. For example, the controller 120 may partition a storage space (e.g., a logical storage space capable of being discriminated by logical addresses) assigned to the nonvolatile memory device 110 into a plurality of segments. The controller 120 may determine that the write data is sequential data if a size (or a capacity) of the write data is greater than or equal to that of at least one segment. For example, the controller 120 may determine whether a capacity (or a size) corresponding to a range in which logical addresses received together with the write request are continuous is greater than or equal to a capacity (or a size) of at least one segment.

If the write data is not sequential data, in step S130, the controller 120 may construct new map data MD_N including a plurality of entries. For example, the controller 120 may map physical addresses, corresponding to a free storage space, from among physical addresses of the nonvolatile memory device 110 to logical addresses of the write request. The controller 120 may construct new map data MD_N including mapping information between logical addresses and physical addresses.

In an exemplary embodiment, the controller 120 may convert logical addresses and physical addresses by a unit of an entry. One entry may include conversion information of one logical address and one physical address. For example, one entry may have a size of 4 Bytes. One physical address may indicate a 4-KB storage space of the nonvolatile memory device 110. That is, one logical address may be converted into one physical address using one entry, and the converted physical address may indicate a storage space of the nonvolatile memory device 110. In the case where the write request corresponds to K logical addresses (K being a positive integer), the new map data MD_N may include K entries.

In step S140, the controller 120 may store the new map data MD_N as partial map data MD_P in the RAM 123.

If the write data is sequential data corresponding to at least one segment, in step S150, the controller 120 may construct new map data MD_N including a plurality of entries. The controller 120 may mark a cache tag on the new map data MD_N. For example, the cache tag may indicate that data stored in at least one segment is sequential data. The cache tag may be marked on at least one of the plurality of entries of the sequential data. For example, the controller 120 may mark a cache tag on a first entry (or a start entry) of a segment.

In step S160, the controller 120 may store at least one entry of the new map data MD_N as cache map data MD_C in the RAM 123. The controller 120 may store at least one entry, on which the cache tag is marked, as the cache map data MD_C in the RAM 123. For example, the controller 120 may store a first entry (or a start entry) of a segment as the cache map data MD_C in the RAM 123.

In step S170, the controller 120 may perform a write operation of the write data and the new map data MD_N. For example, the write data may be written in the nonvolatile memory device 110 as user data UD. The new map data MD_N may be written in the nonvolatile memory device 110 as map data MD.

In an exemplary embodiment, a part of the write data corresponding to the write request may be sequential data of at least one segment, and the rest of the write data may be random data. For example, the write data may be sequential data which is 1.5 times greater in size than one segment. In this case, sequential data, corresponding to one segment, among the write data may cause generation of the cache map data MD_C in steps S150 and S160. Since the rest of the write data is smaller in size than one segment, it may be determined as random data. The rest of the write data may cause generation of partial map data MD_P in steps S130 and S140.

Figure 3:
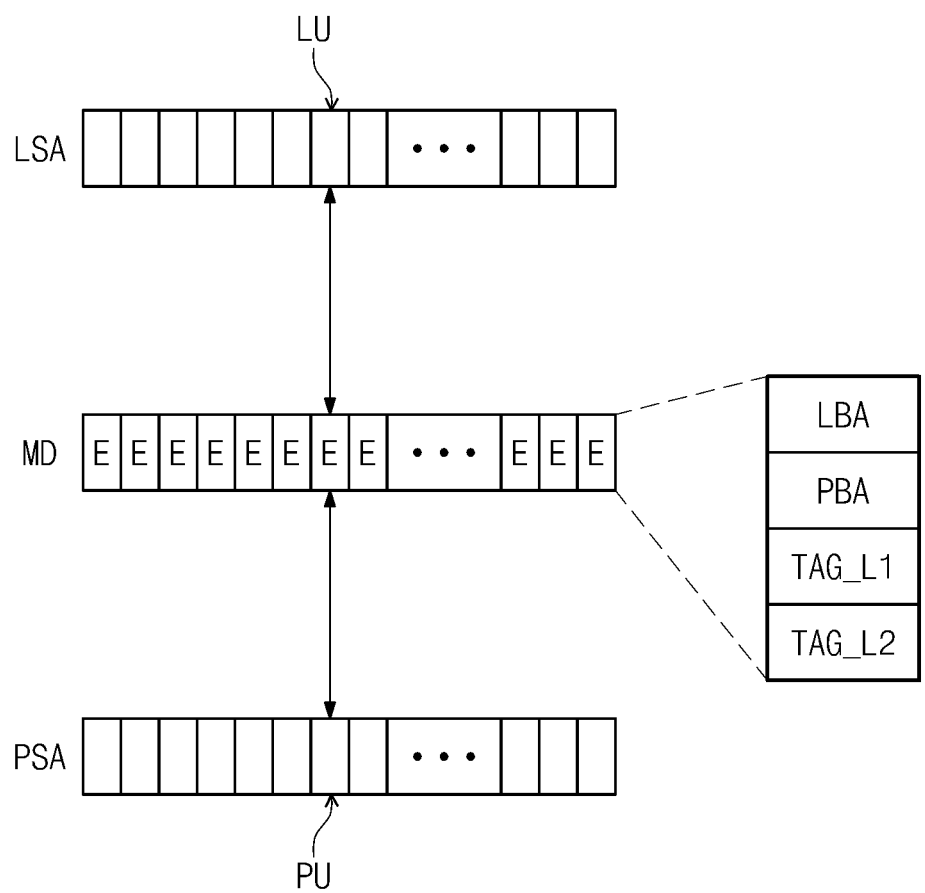
FIG. 3 shows an example in which a controller according to an exemplary embodiment manages a storage space of a storage device.

FIG. 3 shows an example in which a controller 120 according to an exemplary embodiment manages a storage space of a storage device 110. In FIG. 3, there is illustrated a method in which the controller 120 manages map data MD.

Referring to FIG. 3, the controller 120 may perform mapping between a logical storage space LSA discriminated by logical addresses and a physical storage space PSA discriminated by physical addresses, using map data MD. The map data MD may include a plurality of entries E. Each entry E may map a logical unit LU of the logical storage space LSA to a physical unit PU of the physical storage space PSA. One logical unit LU may be discriminated by one logical address. One physical unit PU may be discriminated by one physical address. Each entry E may include a logical address LBA of the logical unit LU and a physical address PBA of the physical unit LU. Each entry E may further include tags TAG_L1 and TAG_L2. The tags TAG_L1 and TAG_L2 may indicate whether data written in the logical unit LU or the physical unit PU corresponding to each entry E is sequential data.

An exemplary embodiment is exemplified as each entry E has two tags TAG_L1 and TAG_L2. However, the number of tags that each entry E has may not be limited thereto. The number of tags that each entry E has may be determined according to a cache level. For example, the first tag TAG_L1 may be set according to an L1 cache, and the second tag TAG_L2 may be set according to an L2 cache.

In an exemplary embodiment, the size of each entry E may be 4 Bytes, and the size of the logical unit LU or the physical unit PU may be 4 KB.

Figure 4:
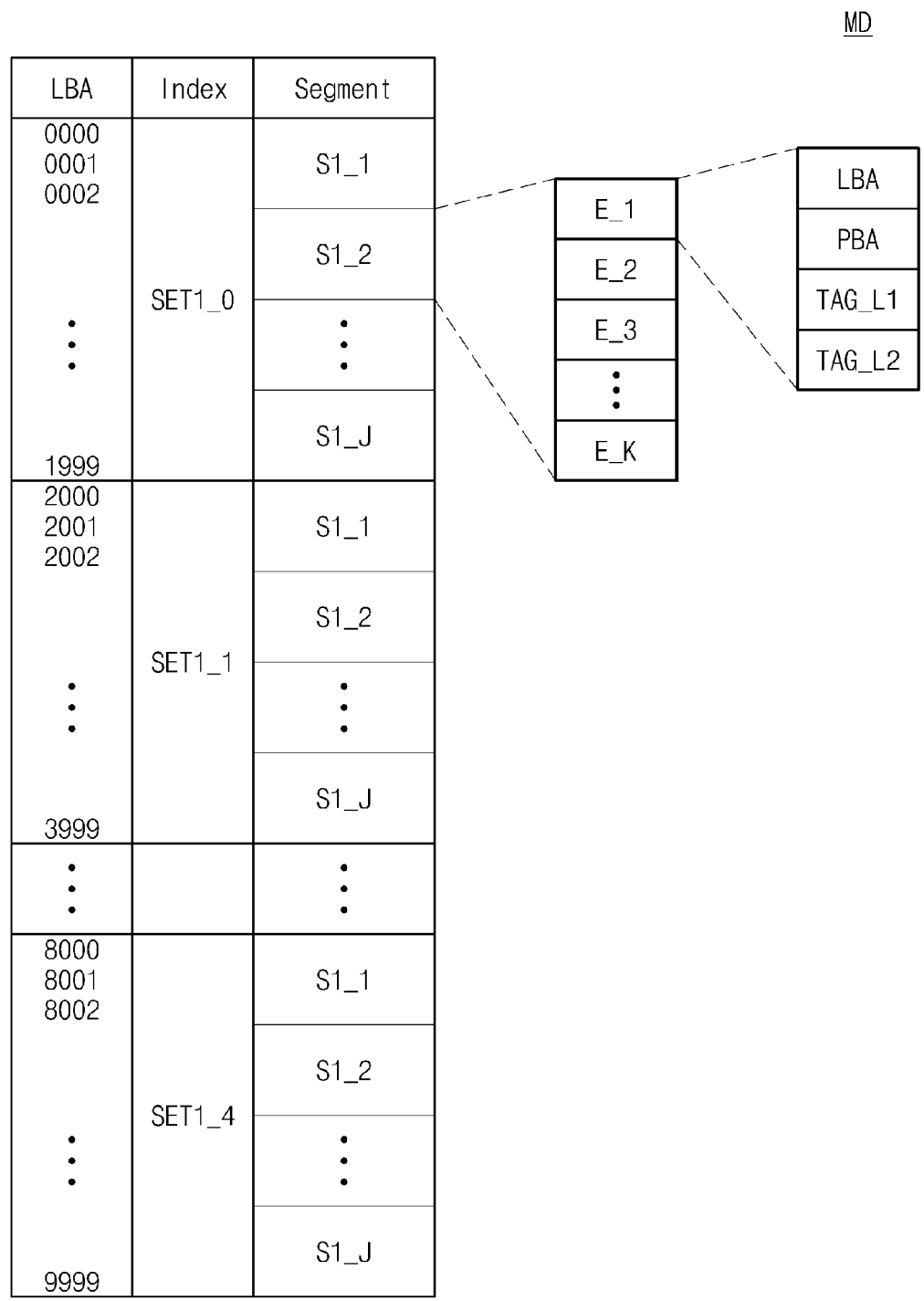
Figure 5:
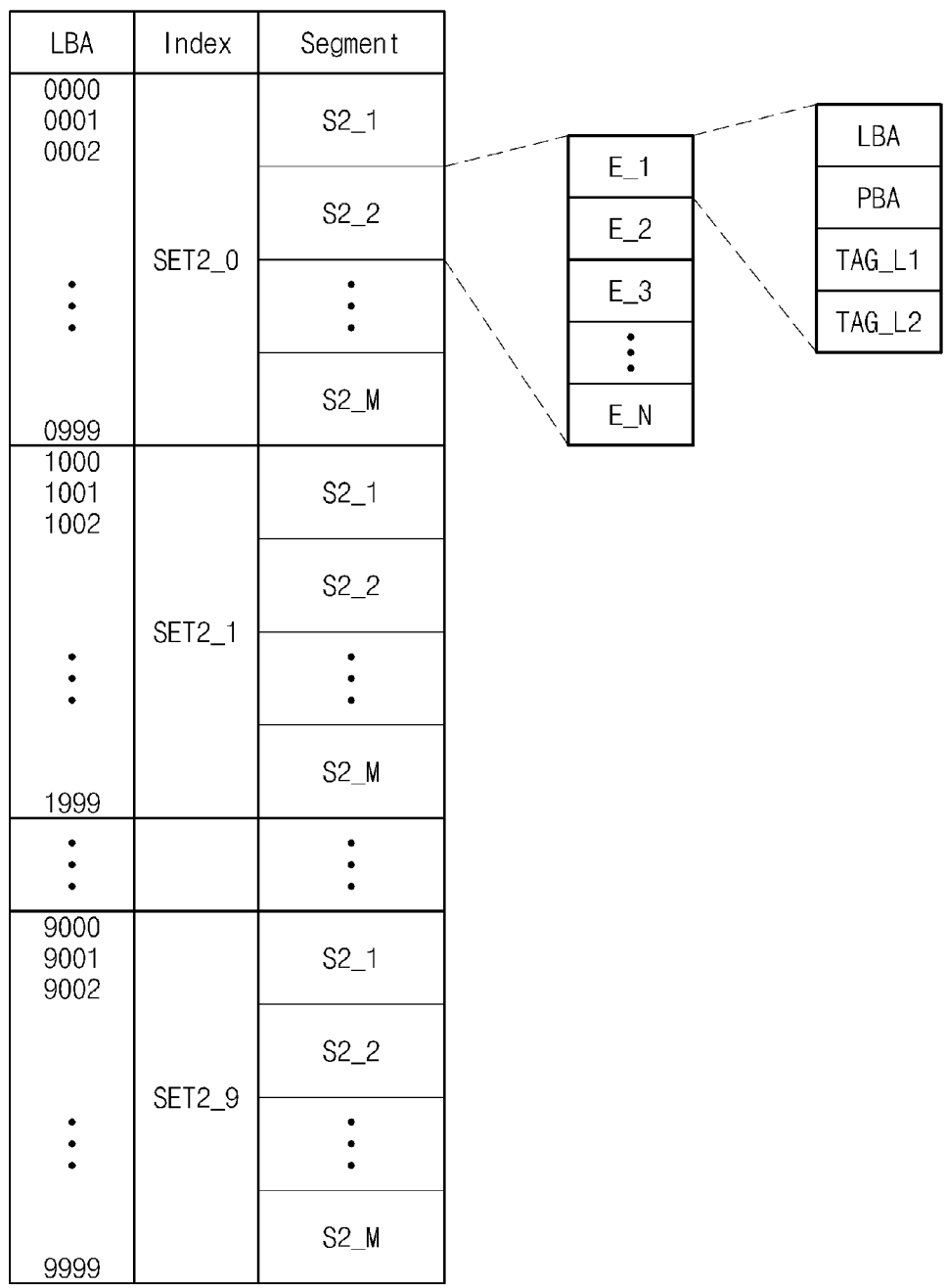

FIGS. 4 to 6 show examples in which a controller 120 manages map data MD based on cache algorithm. In an exemplary embodiment, the controller 120 may manage map data MD using an L1 cache and an L2 cache. The L1 cache and the L2 cache may be managed hierarchically in similar with set associative cache algorithm.

Referring to FIGS. 1 and 4, there is illustrated a method in which the controller 120 manages map data MD using the L1 cache. The controller 120 may partition logical addresses LBA into a plurality of sets. For example, logical addresses LBA of "0000" to "9999" may be assigned to the storage device 110. Logical addresses LBA of the storage device 110 may be partitioned into five sets. Indexes SET1_0 to SET1_4 may be assigned to the partitioned sets. For example, "SET1_0" may correspond to logical addresses LBA of "0000" to "1999", "SET1_1" may correspond to logical addresses LBA of "2000" to "3999", and "SET1_4" may correspond to logical addresses LBA of "8000" to "9999".

Each set of the L1 cache may be partitioned into a plurality of first segments S1_1 to S1_J, each of which includes K entries E_1 to E_K. That is, the controller 120 may manage K entries E_1 to E_K with one first segment. Each entry may include a logical address LBA, a physical address PBA, an L1 cache tag TAG_L1, and an L2 cache tag TAG_L2.

Referring to FIGS. 1 and 5, there is illustrated a method in which the controller 120 manages map data MD using the L2 cache. The controller 120 may partition logical addresses LBA into a plurality of sets. For example, logical addresses LBA may be partitioned into 10 sets. Indexes SET2_0 to SET2_9 may be assigned to the partitioned sets. For example, "SET2_0" may correspond to logical addresses LBA of "0000" to "0999", "SET2_1" may correspond to logical addresses LBA of "1000" to "1999", and "SET2_9" may correspond to logical addresses LBA of "9000" to "9999".

Each set of the L2 cache may be partitioned into a plurality of second segments S2_1 to S1_M, each of which includes N entries E_1 to E_N. That is, the controller 120 may manage N entries E_1 to E_N with one second segment. Each entry may include a logical address LBA, a physical address PBA, an L1 cache tag TAG_L1, and an L2 cache tag TAG_L2.

An exemplary embodiment is exemplified as the sets SET1_0 to SET1_4 of the L1 cache are different from the sets SET2_0 to SET2_9 of the L2 cache. However, the scope and spirit of the inventive concept may not be limited thereto. For example, the L1 cache and the L2 cache may share the same sets.

In an exemplary embodiment, the size of each of the first segments S1_1 to S1_J of the L1 cache may be greater than that of each of the second segments S2_1 to S2_M of the L2 cache. For example, the number (i.e., K) of entries included in each of the first segments S1_1 to S1_J may be greater than the number (i.e., N) of entries included in each of the second segments S2_1 to S2_M.

If the number (i.e., K) of entries included in each of the first segments S1_1 to S1_J of the L1 cache and the size of each of the sets SET1_0 to SET1_4 are determined, the number (i.e., J) of the first segments included in each set of the L1 cache may be determined. If the number (i.e., N) of entries included in each of the second segments S2_1 to S2_M of the L2 cache and the size of each of the sets SET2_0 to SET2_9 are determined, the number (i.e., M) of the second segments included in each set of the L2 cache may be determined.

Referring to FIGS. 1 and 6, the controller 120 may manage cache map data MD_C based on set associative cache algorithm. The L1 cache of the cache map data MD_C may include a first way L1W1 and a second way L1W2. The L2 cache of the cache map data MD_C may include a first way L2W1 and a second way L2W2.

Contents registered at the cache map data MD_C may be a record. Pieces of information in which a record is registered at the cache map data MD_C may be fields. That is, each way may include a segment, a physical address PBA, and an index field. Furthermore, each way may have first segments S1_1 to S1_J and second segments S2_1 to S2_M. Each record may include information about a segment, information about a physical address PBA, and information about an index.

Records of each of ways L1W1 and L1W2 in the L1 cache may be assigned to the first segments S1_1 to S1_J belonging to each set in the L1 cache. Records of each of ways L2W1 and L2W2 in the L2 cache may be assigned to the second segments S2_1 to S2_M belonging to each set in the L2 cache.

In an exemplary embodiment, the L1 cache and the L2 cache of the cache map data MD_C may be managed according to 2-way set associative cache algorithm. However, the scope and spirit of the inventive concept may not be limited thereto. The number of ways of the L1 cache may be different from the number of ways of the L2 cache. Furthermore, the L1 cache or the L2 cache may be managed based on direct cache or associative cache algorithm.

Figure 7:
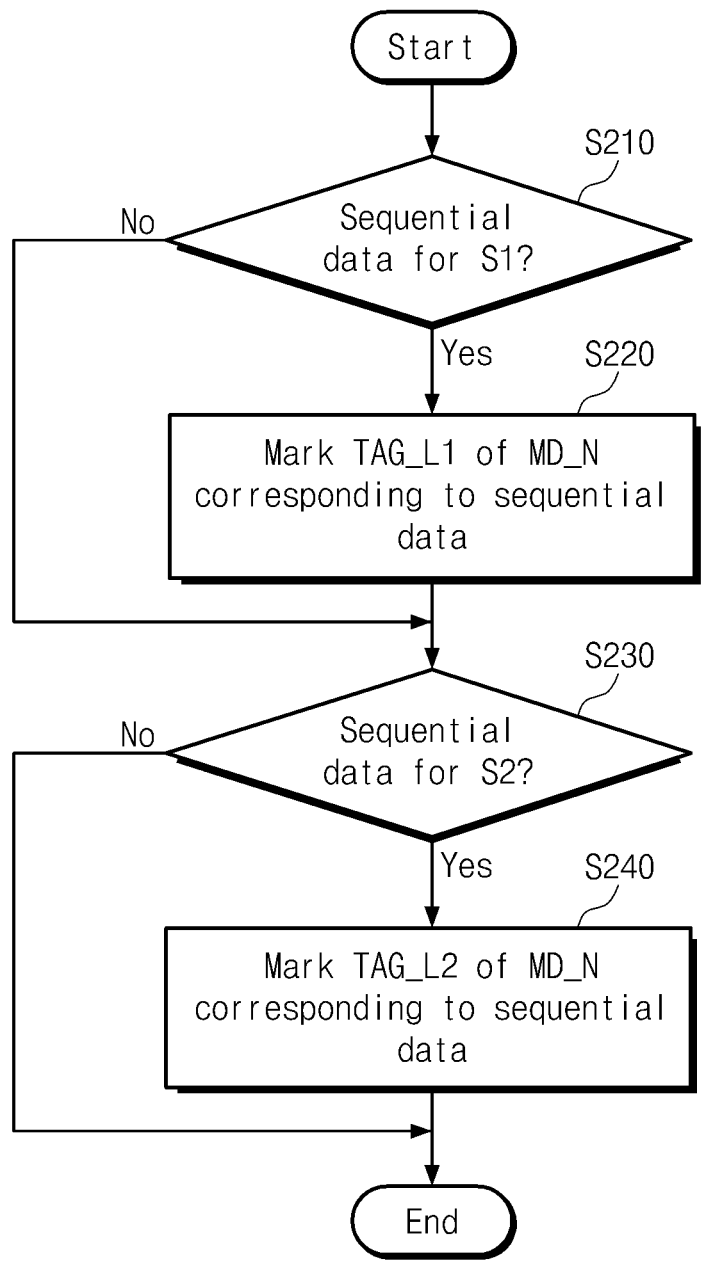
FIG. 7 is a flow chart schematically illustrating an operating method of a storage device according to another exemplary embodiment.

FIG. 7 is a flow chart schematically illustrating an operating method of a storage device 100 according to another exemplary embodiment. In FIG. 7, there is illustrated a method in which the controller 120 marks cache tags TAG_L1 and TAG_L2 based on whether or not of sequential data (S150 of FIG. 2).

Referring to FIGS. 1 and 4 to 7, in step S210, the controller 120 may determine write data received together with a write request is sequential data for a first segment S1. For example, the controller 120 may determine a set and the first segment S1 of the L1 cache corresponding to the write data, based on a logical address LBA received together with the write request. The controller 120 may determine whether the write data is data sequentially written in at least one first segment S1.

If the write data is sequential data for the first segment S1, in step S220, the controller 120 may mark a valid value on an L1 cache tag TAG_L1 of new map data MD_N corresponding to the write request. The controller 120 may mark a valid value on the L1 cache tag TAG_L1 of at least one entry in the at least one first segment S1 corresponding to the write data. For example, the controller 120 may mark a valid value on the L1 cache tag TAG_L1 of a first entry (or a start entry) in each of the first segments S1 corresponding to the write data.

In step S230, the controller 120 may determine whether the write data received together with the write request is sequential data for a second segment S2. For example, the controller 120 may determine a set and the second segment S2 of the L2 cache corresponding to the write data, based on logical addresses LBA received together with the write request. The controller 120 may determine whether the write data is data sequentially written in at least one second segment S2.

If the write data is sequential data for the at least one second segment S2, in step S240, the controller 120 may mark a valid value on an L2 cache tag TAG_L2 of new map data MD_N corresponding to the write request. The controller 120 may mark a valid value on the L2 cache tag TAG_L2 of at least one entry in the at least one second segment S2 corresponding to the write data. For example, the controller 120 may mark a valid value on the L2 cache tag TAG_L2 of a first entry (or a start entry) in each of the second segments S2 corresponding to the write data.

Figure 8:
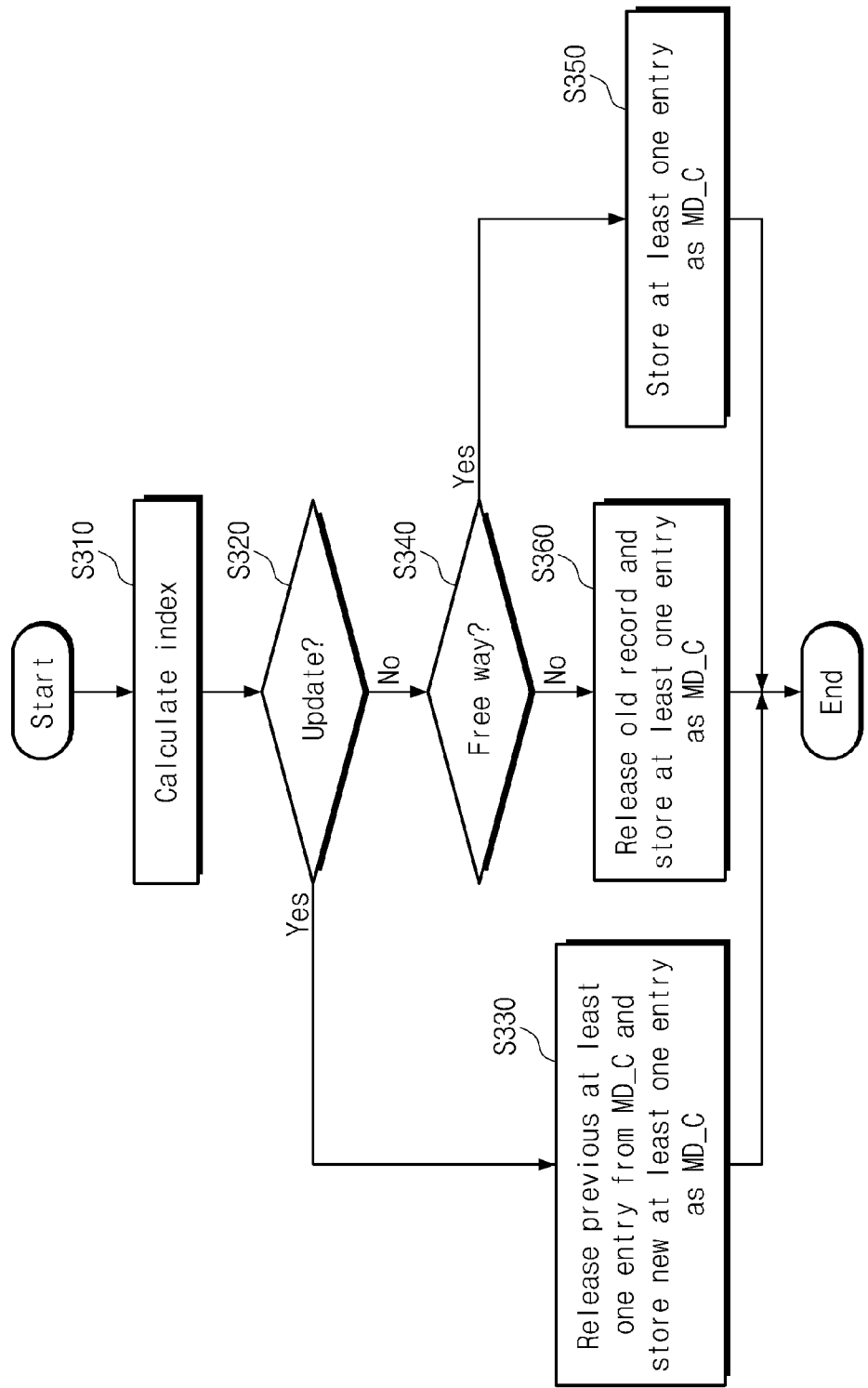
FIG. 8 is a flow chart schematically illustrating an operating method of a storage device according to another exemplary embodiment.

FIG. 8 is a flow chart schematically illustrating an operating method of a storage device 100 according to another exemplary embodiment. In FIG. 8, there is illustrated a method in which the controller 120 stores cache map data MD_C in the RAM 123 (S160 of FIG. 2).

Referring to FIGS. 1, 4 to 6, and 8, in step S310, the controller 120 may calculate an index. For example, as described with reference to FIG. 7, in the case where a valid value is marked on an L1 cache tag TAG_L1, the controller 120 may calculate an index of a set to which a first segment S1 where the L1 cache tag TAG_L1 is written belongs. For example, the controller 120 may calculate an index of an L1 cache using a quotient or a remainder obtained by dividing a most significant bit (MSB) or two or more upper bits including the MSB among logical addresses of an entry, in which the L1 cache tag TAG_L1 is written, by the number of sets of the L1 cache.

For example, as described with reference to FIG. 8, in the case where a valid value is marked on an L2 cache tag TAG_L2, the controller 120 may calculate an index of a set to which a second segment S2 in which the L2 cache tag TAG_L2 is written belongs. For example, the controller 120 may calculate an index of an L2 cache using a quotient or a remainder obtained by dividing a most significant bit (MSB) or two or more upper bits including the MSB among logical addresses of an entry, in which the L2 cache tag TAG_L2 is written, by the number of sets of the L2 cache.

In step S320, the controller 120 may determine whether cache map data MD_C is updated. For example, the controller 120 may determine whether the first segment S1 or the second segment S2 corresponding to the calculated index is previously registered at the cache map data MD_C.

For example, in the case where the calculated index is an index of the L1 cache, whether a record of the same first segment S1 is previously registered at the cache map data MD_C may be determined. For example, the controller 120 may determine whether a record corresponding to the first segment S1 on which the L1 cache tag TAG_L1 is marked is previously registered, in the first and second ways L1W1 and L1W2 of the L1 cache.

For example, in the case where the calculated index is an index of the L2 cache, whether a record of the same second segment S2 is previously registered at the cache map data MD_C may be determined. Furthermore, the controller 120 may determine whether a record of the first segment S1 including a second segment on which the L2 cache tag TAG_L2 is marked is previously registered.

In the case where the cache map data MD_C is updated, in step S330, the controller 120 may release, from the cache map data MD_C, at least one record previously registered at the cache map data MD_C, for example, a record corresponding to at least one entry having a cache tag on which a valid value is previously marked. The controller 120 may store, in the cache map data MD_C, a new record, that is, a record corresponding to at least one entry including a cache tag on which a valid value is newly marked.

In the case where the cache map data MD_C is not updated, in step S340, the controller 120 may determine whether a free way exists. For example, the controller 120 may select ways, corresponding to the calculated index, from among ways L1W1 and L1W2 of the L1 cache or ways L2W1 and L2W2 of the L2 cache. The controller 120 may determine whether a free way in which a record corresponding to a cache tag-marked segment is not written exists in the selected ways.

If the free way exists, in step S350, the controller 120 may store information of at least one entry having a valid value-marked cache tag as the cache map data MD_C in the free way.

If the free way does not exist, in step S360, the controller 120 may release an old record among records corresponding to a segment on which the cache tag is marked and store information of at least one entry, on which a cache tag is newly marked, as the cache map data MD_C at the released location.

Figure 9:
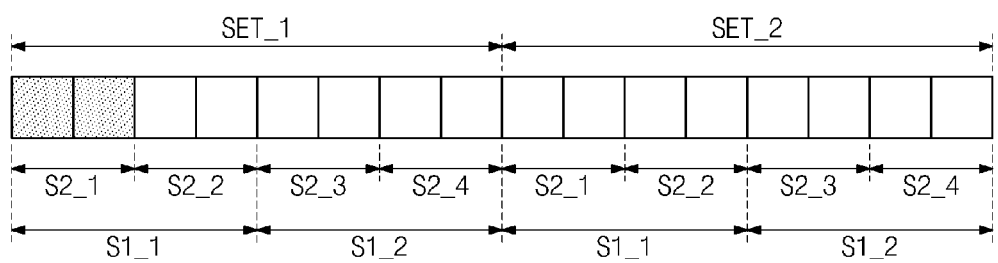
Figure 9:
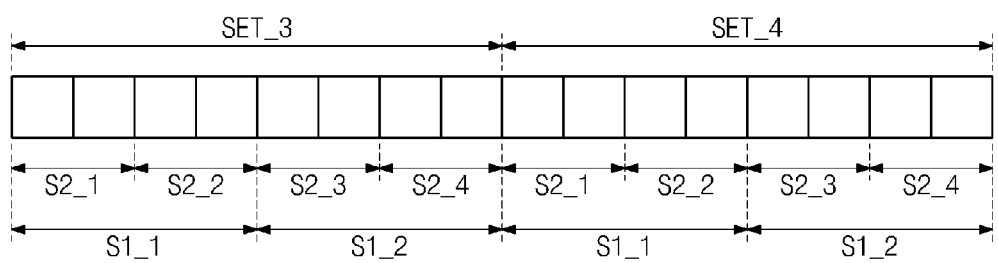

FIGS. 9 to 14 show examples in which sequential data is written in a storage device 100 and cache map data MD_C is registered. Referring to FIGS. 1 and 9, a logical storage space of the storage device 100 may be partitioned into four sets SET_1 to SET_4. In an exemplary embodiment, an L1 cache and an L2 cache may share four sets SET_1 to SET_4.

Each set may be divided into two first segments S1_1 and S1_2 corresponding to the L1 cache. Each set may be divided into four second segments S2_1 to S2_4 corresponding to the L2 cache. Each of the first segments or each of the second segments may include a plurality of entries.

In an exemplary embodiment, sequential data may be written in the second segment S2_1 of a set having index SET_1 according to a request of an external host device. If the sequential data is written, a record corresponding to the sequential data may be registered at cache map data MD_C.

Referring to FIGS. 1, 9, and 10, each of the first way L1W1 and the second way L1W2 of the L1 cache may include records corresponding to two first segments S1_1 and S1_2. Each of the first way L2W1 and the second way L2W2 of the L2 cache may include records corresponding to four second segments S2_1 to S2_4.

As sequential data is written in the second segment S2_1 of a set having index SET_1, a record of the second segment S2_1 may be recorded at the first way L2W1 of the L2 cache. For example, a start physical address PBA1 of a storage space corresponding to the second segment S2_1 in which sequential data is written may be registered at a field of the physical address PBA. The index SET_1 of the set in which the sequential data is written may be registered at an index field.

Figure 11:
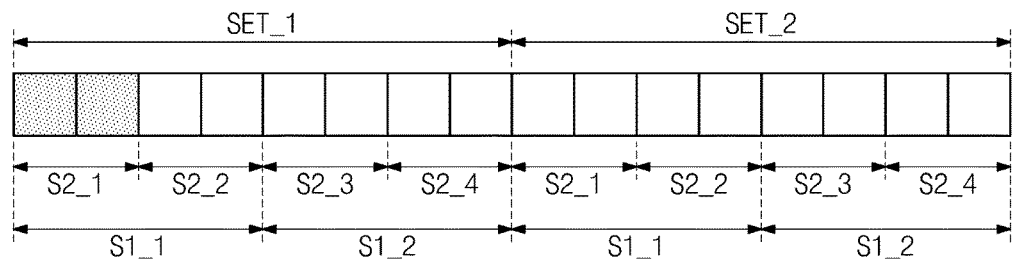
Figure 11:
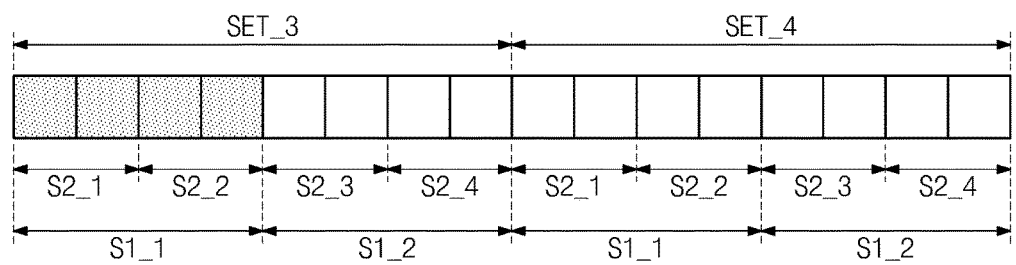

Referring to FIGS. 1 and 11, sequential data may be written at the first segment S1_1 of a set having index SET_3. If the sequential data is written, a record corresponding to the sequential data may be registered at the cache map data MD_C.

Referring to FIGS. 1, 11, and 12, as sequential data is written in the first segment S1_1 of a set having index SET_3, a record of the first segment S1_1 may be recorded at the first way L1W1 of the L1 cache. For example, a start physical address PBA2 of a storage space corresponding to the first segment S1_1 in which sequential data is written may be registered at a field of the physical address PBA. The index SET_3 of the set in which the sequential data is written may be registered at an index field.

Figure 13:
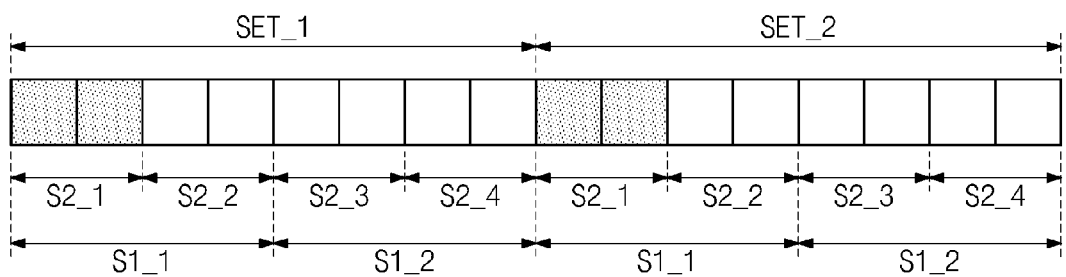
Figure 13:
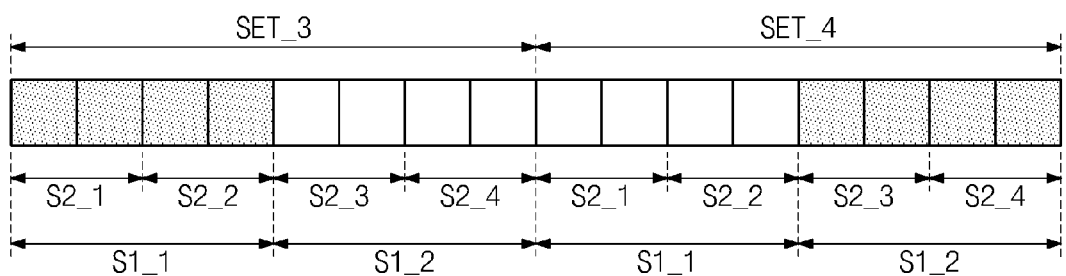

Referring to FIGS. 1 and 13, sequential data may be written at the second segment S2_1 of a set having an index SET_2. If the sequential data is written, a record corresponding to the sequential data may be registered at the cache map data MD_C.

Sequential data may be written in the first segment S1_2 of a set having an index SET_4 according to a request of an external host device. If the sequential data is written, a record corresponding to the sequential data may be registered at the cache map data MD_C.

Referring to FIGS. 1, 13, and 14, as sequential data is written in the second segment S2_1 of a set having index SET_2, a record of the second segment S2_1 may be recorded at the second way L2W2 of the L2 cache. For example, a start physical address PBA3 of a storage space corresponding to the second segment S2_1 in which sequential data is written may be registered at a field of the physical address PBA. The index SET_2 of the set in which the sequential data is written may be registered at an index field.

As sequential data is written in the first segment S1_2 of a set having index SET_4, a record of the first segment S1_2 may be recorded at the first way L1W1 of the L1 cache. For example, a start physical address PBA4 of a storage space corresponding to the first segment S1_2 in which sequential data is written may be registered at a field of the physical address PBA. The index SET_4 of the set in which the sequential data is written may be registered at an index field.

When a write request for sequential data is received, the cache map data MD_C may be processed as described with reference to FIG. 8. In an exemplary embodiment, if the write request for the sequential data corresponds to a free way of the cache map data MD_C, a corresponding record may be registered at the free way of the cache map data MD_C.

In the cache map data MD_C of the L1 cache, for example, each of the first segments S1_1 and S1_2 may include one free way. Accordingly, a record of a corresponding segment may be registered at the cache map data MD_C if writing of sequential data is requested with respect to each of the first segments S1_1 and S1_2.

In the cache map data MD_C of the L2 cache, for example, each of the second segments S2_2 and S2_4 may include two free ways. Accordingly, a record of a corresponding segment may be registered at the cache map data MD_C if writing of sequential data is requested with respect to each of the second segments S2_2 and S2_4.

In an exemplary embodiment, if the write request for the sequential data does not correspond to a free way of the cache map data MD_C, an older record may be released, and a new record may be registered at the released space.

For example, no free way may exist at the second segment S2_1 of the L2 cache. If writing of sequential data is requested with respect to the second segment S2_1, the controller 120 may release an older record among records of the second segment S2_1, that is, the first way L2W1. Afterwards, the controller 120 may register a new record of the second segment S2_1 at the first way L2W1.

In an exemplary embodiment, the record may be updated if the write request for sequential data corresponds to a record previously registered at the cache map data MD_C. For example, a record of the first segment S1_1 having index SET_3 and a record of the second segment S1_2 having index SET_4 may be registered at the cache map data MD_C of the L1 cache. If writing of sequential data is requested with respect to a storage space (e.g., a logical storage space) corresponding to a corresponding record, the controller 120 may update a corresponding record. For example, the controller 120 may map a logical storage space corresponding to the registered record to a new physical storage space and may write a new physical address PBA in the cache map data MD_C.

Likewise, a record of the second segment S2_1 having index SET_1 and a record of the second segment S2_1 having an index SET_2 may be registered at the cache map data MD_C of the L2 cache. The controller 120 may update a corresponding record if writing of sequential data is requested with respect to a storage space (e.g., a logical storage space) corresponding to a corresponding record.

Figure 15:
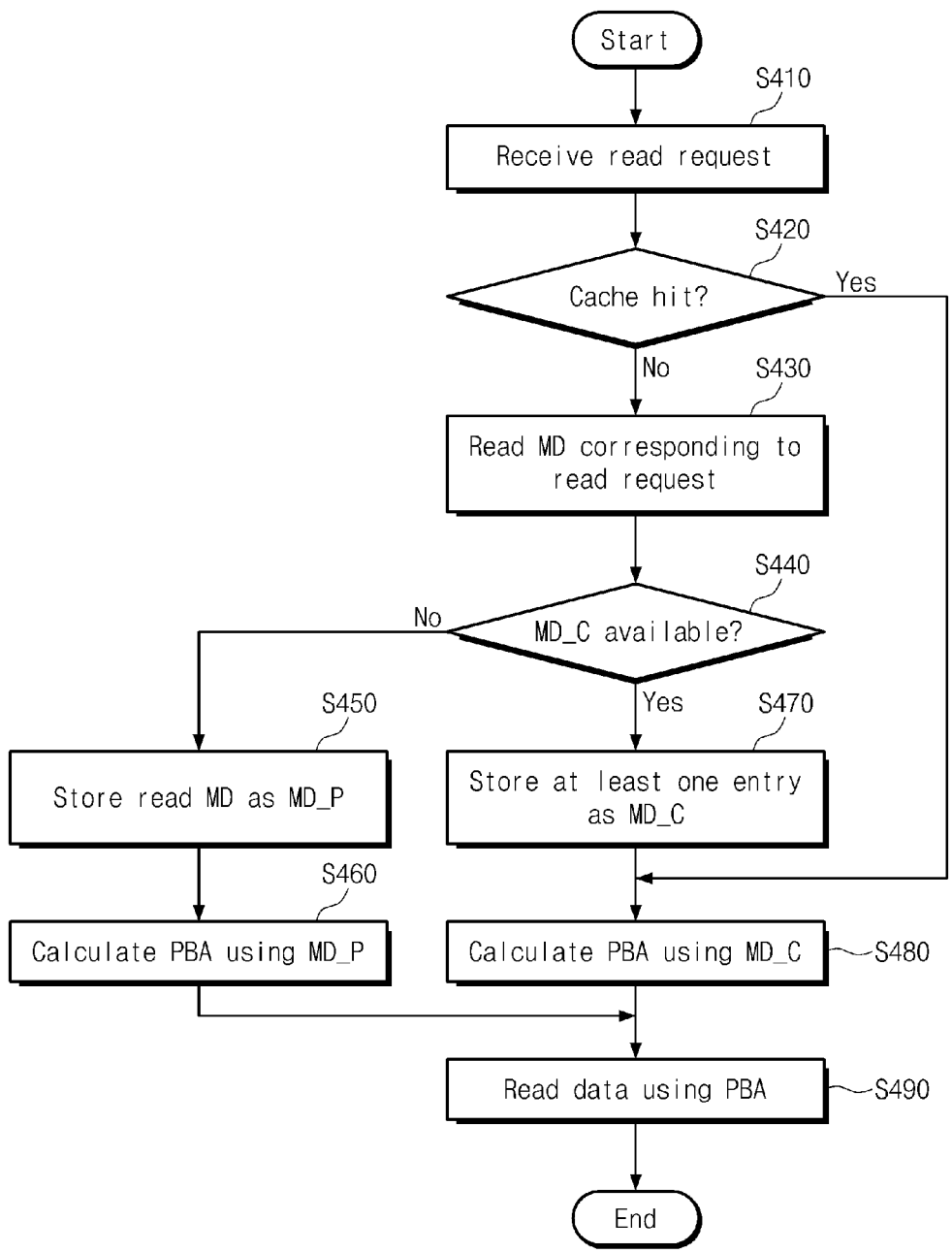
FIG. 15 is a flow chart schematically illustrating an operating method of a storage device according to another exemplary embodiment.

FIG. 15 is a flow chart schematically illustrating an operating method of a storage device 100 according to another exemplary embodiment. In FIG. 15, there is illustrated a method in which the controller 120 performs a read operation using the cache map data MD_C or partial map data MD_P.

Referring to FIGS. 1, 14, and 15, in step S410, the controller 120 may receive a read request from an external host device.

In step S420, the controller 120 may determine whether a cache hit is generated. For example, the controller 20 may check a segment corresponding to the read request and determine whether a record of the checked segment is registered at the cache map data MD_C. For example, the controller 120 may determine whether a record of the first segment S1 or the second segment S2 including read-requested logical addresses is registered at the cache map data MD_C.

If the record corresponding to the read request is registered at the cache map data MD_C, the controller 120 may determine whether an index of the registered record is the same as an index of the segment corresponding to the read request. It may be determined that the cache hit is generated if the index of the registered record is the same as the index of the read-requested segment. If a cache hit occurs, the method may proceed to step S480; but if not so, the method may proceed to step S430.

In step S430, the controller 120 may read map data MD corresponding to the read request from the nonvolatile memory device 110.

In step S440, the controller 120 may determine whether it is possible to construct the cache map data MD_C. For example, the controller 120 may determine whether a valid cache tag is marked on at least one entry of a segment corresponding to the read request. In the case where the valid cache tag is marked, it may be determined that construction of the cache map data MD_C is possible, because sequential data was stored in the segment corresponding to the read request, and the method may proceed to step S470. However, in the case where the valid cache tag is not marked, it may be determined that construction of the cache map data MD_C is impossible, and the method may proceed to step S450.

In step S450, the controller 120 may store map data MD corresponding to the read request as partial map data MD_P in the RAM 123. In step S460, the controller 120 may calculate physical addresses PBA based on the partial map data MD_P. For example, the controller 120 may calculate the physical addresses PBA based on logical addresses LBA and entries of the partial map data MD_P. Afterwards, the method may proceed to step S490.

If construction of the cache map data MD_C is possible, in step S470, the controller 120 may register information of at least one entry on which a valid cache tag is marked, at a record of the cache map data MD_C. Afterwards, the method may proceed to step S480.

Since the cache map data MD_C corresponding to the read request is stored in the RAM 123, in step S480, the controller 120 may calculate physical addresses PBA based on the cache map data MD_C. For example, the cache map data MD_C may include a start physical address of a segment corresponding to the read request. Read-requested data may be sequential data or a part of the sequential data. Accordingly, a start physical address of the read-requested data may be calculated based on a location in a segment of read-requested logical addresses LBA and a start physical address included in the cache map data MD_C. If the start physical address of the read-requested data is calculated, the controller 120 may calculate all physical addresses corresponding to the read request, based on the logical addresses LBA of the read request.

In step S490, the controller 120 may read data from the nonvolatile memory device 110 using the calculated physical addresses PBA.

Figure 16:
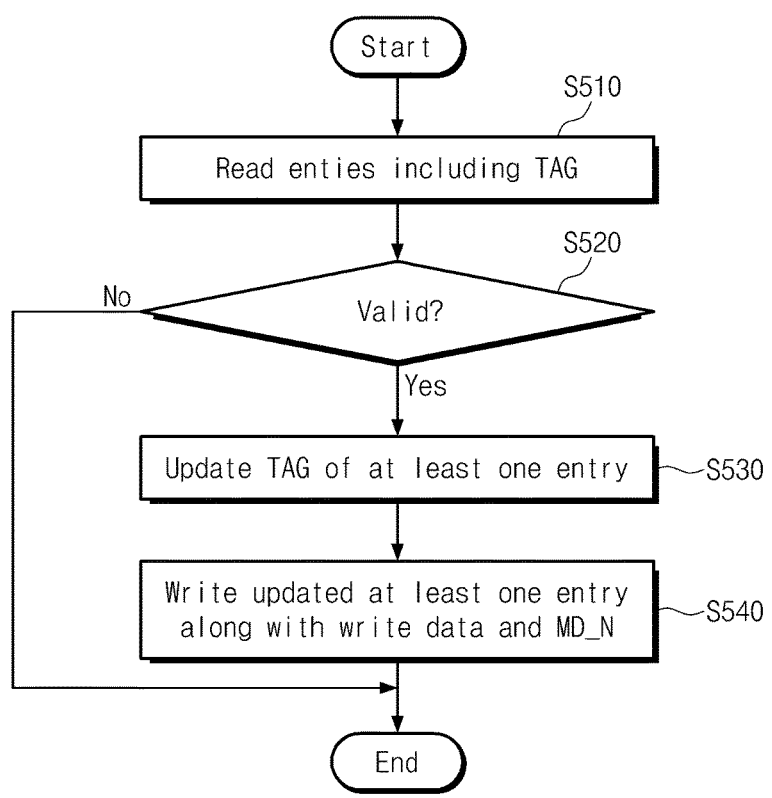
FIG. 16 is a flow chart schematically illustrating an operating method of a storage device according to another exemplary embodiment.

FIG. 16 is a flow chart schematically illustrating an operating method of a storage device 100 according to another exemplary embodiment. In FIG. 16, there is illustrated an example in which the controller 120 updates map data MD stored in the nonvolatile memory device 110 based on a write request of an external host device.

Referring to FIGS. 1 and 16, in step S510, the controller 120 may read entries each including a cache tag from the nonvolatile memory device 110. For example, the controller 120 may read at least one entry, on which the cache tag is marked, from among entries of a first segment S1 or a second segment S2 to which a storage space where data corresponding to a write request is to be written belongs. The controller 120 may read at least one entry which is not included in entries corresponding to the write request and belongs to a segment including the entries corresponding to the write request and on which the cache tag is marked.

In step S520, the controller 120 may determine whether a valid cache tag is marked on the at least one entry which is read. If the valid cache tag is not marked, the controller 120 may not perform an additional operation. If the valid cache tag is marked, the method may proceed to step S530.

In step S530, the controller 120 may update the cache tag of the at least one entry. For example, the controller 120 may mark an invalid value on the cache tag.

In step S540, the controller 120 may write the at least one entry together with the write data and new map data MD_N in the nonvolatile memory device 110.

Figure 17:
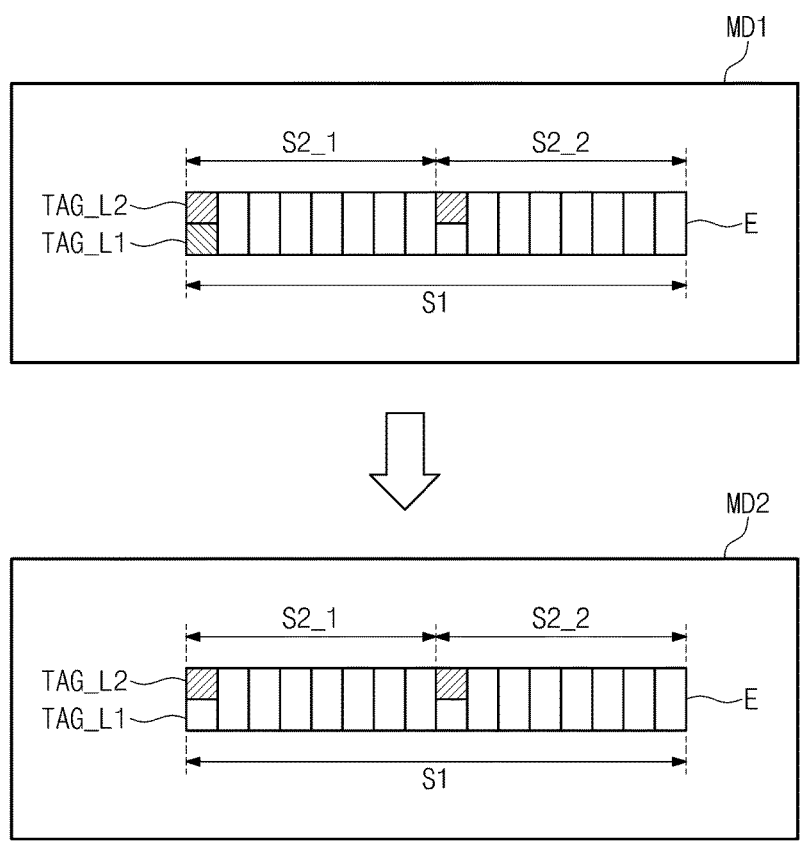
FIG. 17 shows an example in which at least one entry of a segment is updated according to a method of FIG. 16.

FIG. 17 shows an example in which at least one entry of a segment is updated according to a method of FIG. 16. In FIG. 17, there is illustrated an example in which first map data MD1 is updated with second map data MD2 based on a write request.

Referring to FIGS. 1 and 17, a first segment S1 and second segments S2_1 and S2_2 may be included in the first map data MD1. A first entry E of the first segment S1 may include an L1 cache tag TAG_L1. Each of first entries E of the second segments S2_1 and S2_2 may include L2 cache tags TAG_L2.

In an exemplary embodiment, oblique lines in the L1 cache tag TAG_L1 may indicate that a valid value is marked. Oblique lines in the L2 cache tag TAG_L2 may indicate that valid values are marked. That is, the first map data MD1 may indicate that sequential data is written in the first segment S1.

If sequential data is written in the second segment S2_2, the first map data MD1 may be updated with the second map data MD2. If sequential data is written in the second segment S2_2, a valid value may be marked on the L2 cache tag L2_TAG of the second segment S2_2.

If data written in the second segment S2_2 is updated, physical addresses PBA mapped on the second segment S2_2 may be updated. The second segments S2_1 and S2_2 may be continuous in a logical storage space LSA, but may not be continuous in a physical storage space PSA. Accordingly, continuity of the first segment S1 may be released.

The controller 120 may read, in a segment corresponding to a write request, that is, the second segment S2_2 and the first segment S1, an entry (i.e., a first entry of the first segment S1) to which entries corresponding to the write request belong, which is not included in write-requested entries and stores a cache tag, from the nonvolatile memory device 110. An L1 cache tag TAG_L1 of the read entry may be marked as a valid value. Accordingly, the controller 120 may update the L1 cache tag TAG_L1 with an invalid value and write the updated L1 cache tag in the nonvolatile memory device 110.

As described above, the storage device 100 according to an exemplary embodiment may use the cache map data MD_C with respect to sequential data corresponding to each segment and use the partial map data MD_P with respect to data except the sequential data. Accordingly, an operating speed of the storage device 100 may be improved upon accessing sequential data.

Exemplary embodiments are illustrated as the cache map data MD_C is managed based on the L1 and L2 caches. However, the number of levels of the cache map data MD_C may not be limited thereto. Furthermore, a cache of each level may be based on set associative cache algorithm, direct cache algorithm, or associative cache algorithm.

In an exemplary embodiment, the size of a segment of each level may be determined according to a communication characteristic between an external host device and the controller 120. For example, the size of a segment of each level may be set to the size of data read/write-requested by an external host device, that is, a transaction size or a multiple thereof. The size of a segment of each level may be set to an input/output bandwidth between the external host device and the controller 120 or a multiple thereof. The size of a segment of each level may be set to a unit by which the external host device accesses the controller 120, that is, a sector or cluster size or a multiple thereof.

In another exemplary embodiment, the size of a segment of each level may be determined according to operating characteristics of the nonvolatile memory device 110 and the controller 120. For example, the size of a segment of each level may be set to a unit of a read operation of the nonvolatile memory device 110 or a multiple thereof. The size of a segment of each level may be determined according to a size of a data buffer of the RAM 123, a size of an area which is set to store map data MD, from among the RAM 123, a value associated therewith, or a size of an error correction unit of the ECC block 128.

In an exemplary embodiment, the first segment S1 may correspond to entries of 8 KB, and the second segment S2 may correspond to entries of 2 KB. In another exemplary embodiment, the first segment S1 may correspond to entries of 1 KB, and the second segment S2 may correspond to entries of 256 Bytes.

Returning to FIG. 1, the nonvolatile memory device 110 may perform read, write and erase operations according to control of the controller 120. The nonvolatile memory device 110 may receive a command and an address from the controller 120 through an input/output channel, and exchange data with the controller 120 through the input/output channel.

The nonvolatile memory device 110 may exchange a control signal with the controller 120. For example, the nonvolatile memory device 110 may receive, from the controller 120, at least one of a chip enable signal /CE for selecting at least one of a plurality of nonvolatile memory chips in the nonvolatile memory device 110, a command latch enable signal CLE indicating that a signal received from the controller 120 through the input/output channel is the command, an address latch enable signal ALE indicating that a signal received from the controller 120 through the input/output channel is an address, a read enable signal /RE generated by the controller 120 at a read operation, periodically toggled, and used to tune timing, a write enable signal /WE activated by the controller 120 when the command or the address is transmitted, a write protection signal /WP activated by the controller 120 to prevent unintended writing or erasing when a power changes, and a data strobe signal DQS used to adjust input synchronization for the data transmitted through the input/output channel and generated from the controller 120 at a write operation so as to be periodically toggled. For example, the nonvolatile memory device 110 may output, to the controller 120, at least one of a ready/busy signal R/nB indicating whether the nonvolatile memory device 110 is performing a program, erase or read operation, and a data strobe signal DQS used to adjust output synchronization for the data and generated from the read enable signal /RE by the nonvolatile memory device 110 so as to be periodically toggled.

The nonvolatile memory device 110 may include a flash memory. However, the scope and spirit of the inventive concept may not be limited thereto. For example, the nonvolatile memory device 110 may include at least one of nonvolatile memory devices, such as a phase-change RAM (PRAM), a magnetic RAM (MRAM), a resistive RAM (RRAM), and a ferroelectric RAM (FeRAM).

The controller 120 may control the nonvolatile memory device 110. For example, the controller 120 may control the nonvolatile memory device 110 through an input/output channel and a control channel so as to perform a write, read or erase operation.

The controller 120 may control the nonvolatile memory device 110 according to control of an external host device (not illustrated). For example, the controller 120 may communicate with the external host device based on the format different from the format for communication with the nonvolatile memory device 110. A unit of data which the controller 120 conveys to the nonvolatile memory device 110 may be different from a unit of data which the controller 120 conveys to the external host device.

The controller 120 may use the RAM 123 as a working memory, a buffer memory, or a cache memory. The controller 120 may store data or codes, needed to manage the nonvolatile memory device 110, at the RAM 123. For example, the controller 120 may read data or codes, needed to manage the nonvolatile memory device 110, from the nonvolatile memory device 110 and load the read data or codes on the RAM 123 for driving.

The RAM 123 may include at least one of a variety of random access memories, such as, but not limited to, an SRAM, a DRAM, an SRAM, a PRAM, an MRAM, an RRAM, and an FRAM.

The nonvolatile memory device 110 may include a plurality of nonvolatile memory chips. In an exemplary embodiment, the controller 120 and the nonvolatile memory chips may be interconnected based on a channel and a way. One channel may include one data channel and one control channel. One data channel may include eight data lines. One control channel may include control lines for transferring the chip enable signal /CE, the command latch enable signal CLE, the address latch enable signal ALE, the read enable signal /RE, the write enable signal /WE, the write protect signal /WP, and the ready/busy signal R/nB.

Nonvolatile memory chips connected to one channel may constitute a way. If n nonvolatile memory chips are connected to one channel, n nonvolatile memory chips may compose an n-way. Nonvolatile memory chips belonging to one way may share data lines and the control lines for transferring the command latch enable signal CLE, the address latch enable signal ALE, the read enable signal /RE, the write enable signal /WE, and the write protect signal /WP. Each of nonvolatile memory chips belonging to one way may communicate with the controller 120 through dedicated control lines for the chip enable signal /CE and the ready/busy signal R/nB.

The controller 120 may alternately access n-way nonvolatile memory chips connected to one channel. The controller 120 may independently access nonvolatile memory chips connected to different channels. The controller 120 may alternately or simultaneously access nonvolatile memory chips connected to different channels.

In exemplary embodiments, nonvolatile memory chips may be connected to the controller 120 in the form of a wide IO (input/output). For example, nonvolatile memory chips connected to different channels may share a control line for a chip enable signal /CE. Nonvolatile memory chips which share the control line for the chip enable signal /CE may be accessed at the same time. Data lines of different channels may be used at the same time, and thus, a wide input/output bandwidth may be achieved.

The storage device 100 may include a solid state drive (SSD) or a hard disk drive (HDD). The storage device 100 may include memory cards, such as PC card (personal computer memory card international association (PCM-CIA)), compact flash (CF) card, smart media card (SM, SMC), memory stick, multimedia card (MMC, RS-MMC, MMCmicro), SD card (SD, miniSD, microSD, SDHC), universal serial bus (USB) memory card, and universal flash storage (UFS). The storage device 100 may include embedded memories, such as embedded MultiMedia card (eMMC), UFS, and PPN (Perfect Page NAND).

In FIG. 1, an exemplary embodiment is illustrated as the RAM 123 is disposed outside the controller 120. However, the scope and spirit of the inventive concept may not be limited thereto. For example, the storage device 100 may not include the RAM 123 which is disposed outside the controller 120. The controller 120 may use an internal RAM (refer to FIG. 9) as a buffer memory, a working memory, or a cache memory.

Figure 18:
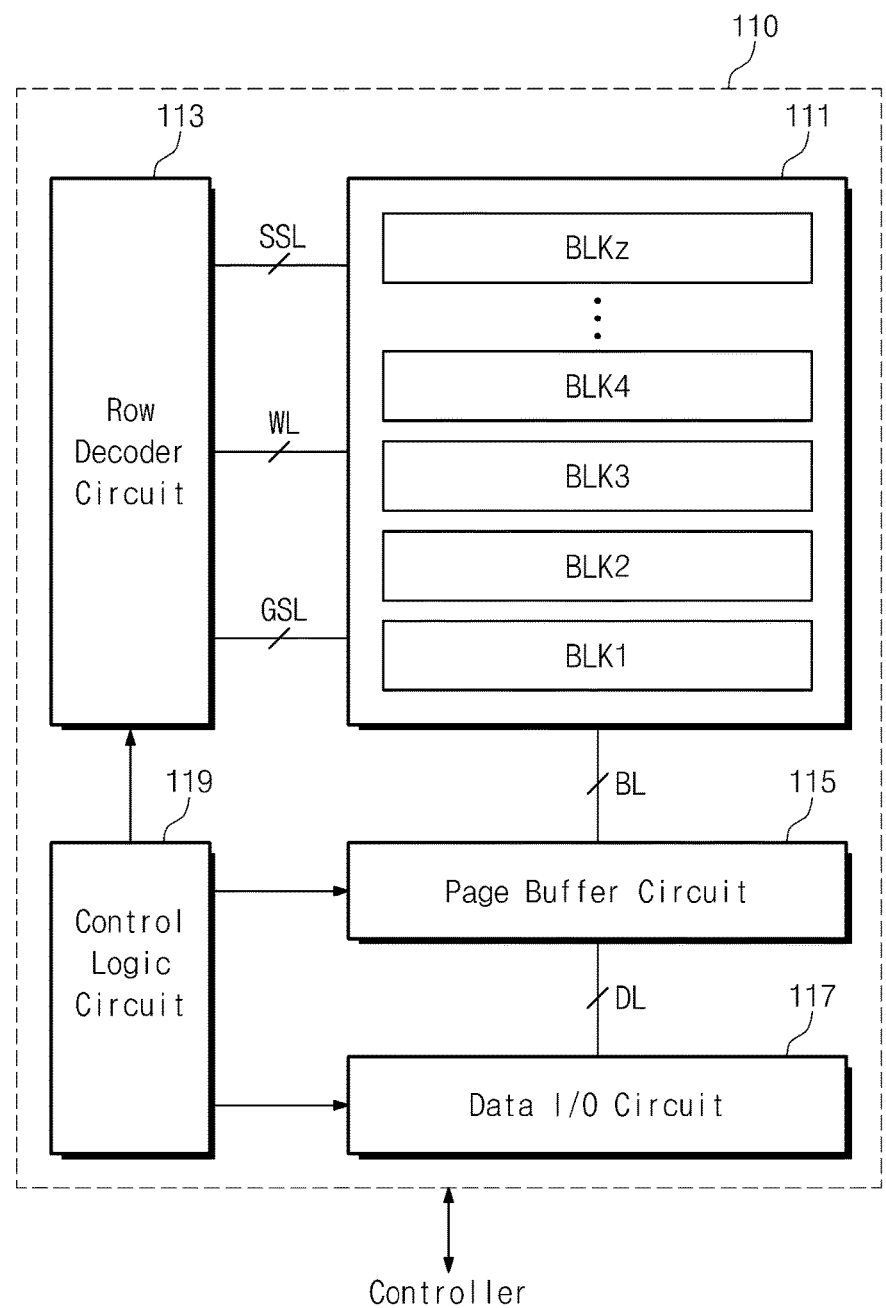
FIG. 18 is a block diagram schematically illustrating a nonvolatile memory according to an exemplary embodiment.

FIG. 18 is a block diagram schematically illustrating a nonvolatile memory 110 according to an exemplary embodiment. Referring to FIG. 18, a nonvolatile memory 110 may include a memory cell array 111, a row decoder circuit 113, a page buffer circuit 115, a data input/output circuit 117, and a control logic circuit 119.

The memory cell array 111 may include a plurality of memory blocks BLK1 through BLKz, each of which includes a plurality of memory cells. Each memory block may be connected to the row decoder circuit 113 through at least one string selection line SSL, a plurality of word lines WL, and at least one ground selection line GSL. Each memory block may be connected to the page buffer circuit 115 through a plurality of bit lines BL. The memory blocks BLK1 through BLKz may be connected in common to the plurality of bit lines BL. Memory cells in the memory blocks BLK1 through BLKz may have the same structure.

Each of the memory blocks BLK1 through BLKz may be a unit of an erase operation. An erase operation may be carried out by the memory block. Memory cells in a memory block may be erased at the same time. Each memory block may be divided into a plurality of sub-blocks, and an erase operation may be carried out by the sub-block.

Each of the memory blocks BLK1 through BLKz may include a physical storage space which is distinguished by a block address. Each of the word lines WL may correspond to a physical storage space which is distinguished by a row address, and each of the bit lines BL may correspond to a physical storage space which is distinguished by a column address.

The row decoder circuit 113 may be connected to the memory cell array 111 through a plurality of ground selection lines GSL, a plurality of word lines WL, and a plurality of string selection lines SSL. The row decoder circuit 113 may operate according to control of the control logic circuit 119. The row decoder circuit 113 may decode an address received from a controller 120 through an input/output channel and control voltages to be applied to the plurality of string selection lines SSL, the plurality of word lines WL, and the plurality of ground selection lines GSL based on the decoded address.

For example, at programming, the row decoder circuit 113 may apply a program voltage to a selected word line in a memory block selected by an address, and apply a pass voltage to unselected word lines in the selected memory block. At reading, the row decoder circuit 113 may apply a selection read voltage to the selected word line in the selected memory block, and apply a non-selection read voltage to unselected word lines in the selected memory block. At erasing, the row decoder circuit 113 may apply an erase voltage (e.g., a ground voltage or a low voltage of which the level is similar to that of the ground voltage) to word lines in the selected memory block.

The page buffer circuit 115 may be connected to the memory cell array 111 through the bit lines BL. The page buffer circuit 115 may be connected to the data input/output circuit 117 through a plurality of data lines DL. The page buffer circuit 115 may operate according to control of the control logic circuit 119.

During programming, the page buffer circuit 115 may store data to be programmed in memory cells. The page buffer circuit 115 may apply voltages to the bit lines BL based on the stored data. The page buffer circuit 115 may function as a write driver at the programming operation. During reading, the page buffer circuit 115 may sense voltages on the bit lines BL and store the sensed results. The page buffer circuit 115 may function as a sense amplifier at the reading operation.

The data input/output circuit 117 may be connected to the page buffer circuit 115 through the data lines DL. The data input/output circuit 117 may output data, which is read by the page buffer circuit 115, to the controller 120 through the input/output channel and transfer data, which is received from the controller 120 through the input/output channel, to the page buffer circuit 115.

The control logic circuit 119 may receive a command from the controller 120 through the input/output channel and receive a control signal from the controller 120 through a control channel. The control logic circuit 119 may receive a command, which is received through the input/output channel, in response to the control signal, route an address, which is received through the input/output channel, to the row decoder circuit 113, and route data, which is received through the input/output channel, to the data input/output circuit 117. The control logic circuit 119 may decode the received command and control the nonvolatile memory device 110 based on the decoded command.

The control logic circuit 119 may generate a data strobe signal DQS based on a read enable signal /RE received from the controller 120 through the input/output channel. The generated data strobe signal DQS may be outputted to the controller 120 through the control channel. At writing, the control logic circuit 119 may receive the data strobe signal DQS from the controller 120 through the control channel.

Figure 19:
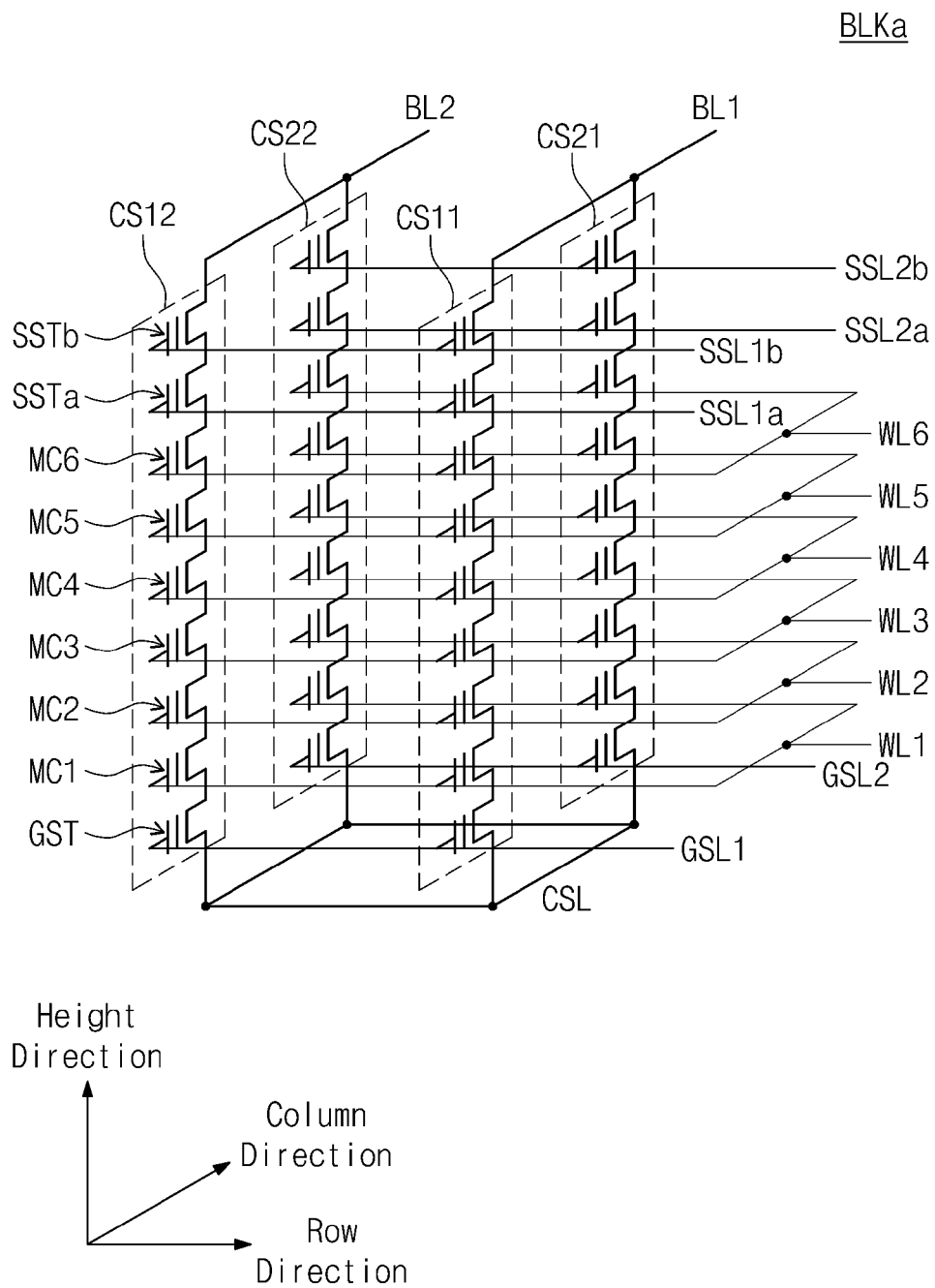
FIG. 19 is a circuit diagram schematically illustrating a memory block according to an exemplary embodiment.

FIG. 19 is a circuit diagram schematically illustrating a memory block BLKa according to an exemplary embodiment. Referring to FIG. 19, a memory block BLKa may include a plurality of cell strings CS11 to CS21 and CS12 to CS22 which may be arranged in a matrix of rows and columns.

For example, the cell strings CS11 and CS12 arranged along a row direction may constitute a first row, and the cell strings CS21 and CS22 arranged along the row direction may constitute a second row. The cell strings CS11 and CS21 arranged along a column direction may constitute a first column, and the cell strings CS12 and CS22 arranged along the column direction may constitute a second column.

Each cell string may include a plurality of cell transistors. The plurality of cell transistors may include ground selection transistors GST, memory cells MC1 through MC6, and string selection transistors SSTa and SSTb. The ground selection transistors GST, memory cells MC1 through MC6, and string selection transistors SSTa and SSTb in each cell string may be stacked in a height direction perpendicular to a plane (e.g., a plane on a substrate of the memory block BLKa) on which the cell strings CS11 to CS21 and CS12 to CS22 are arranged along the rows and the columns.

Each cell transistor may be a charge trap type cell transistor of which the threshold voltage changes according to the amount of charges trapped in an insulating layer thereof.

Lowermost ground selection transistors GST may be connected in common to a common source line CSL.

Control gates of ground selection transistors GST of the cell strings CS11 to CS21 and CS12 to CS22 may be connected to ground selection lines GSL1 and GSL2, respectively. In exemplary embodiments, ground selection transistors in the same row may be connected to the same ground selection line, and ground selection transistors of different rows may be connected to different ground selection lines. For example, the ground selection transistors GST of the cell strings CS21 and CS22 in the first row may be connected to the first ground selection line GSL1, and the ground selection transistors GST of the cell strings CS21 and CS22 in the second row may be connected to the second ground selection line GSL2.

Control gates of memory cells that are placed at the same height (or order) from the substrate (or the ground selection transistors GST) are connected in common to a word line, and control gates of memory cells that are placed at different heights (or orders) are connected to different word lines WL1 to WL6. For example, the memory cells MC1 may be connected in common to the word line WL1, the memory cells MC2 may be connected in common to the word line WL2, and the memory cells MC3 may be connected in common to the word line WL3. The memory cells MC4 may be connected in common to the word line WL4, the memory cells MC5 may be connected in common to the word line WL5, and the memory cells MC6 may be connected in common to the word line WL6.

In first string selection transistors SSTa, having the same height (or order), of the cell strings CS11 to CS21 and CS12 to CS22, control gates of the first string selection transistors SSTa in different rows may be connected to different string selection lines SSL1a and SSL2a, respectively. For example, the first string selection transistors SSTa of the cell strings CS11 and CS12 may be connected in common to the string selection line SSL1a, and the first string selection transistors SSTa of the cell strings CS21 and CS22 may be connected in common to the string selection line SSL2a.

In second string selection transistors SSTb, having the same height (or order), of the cell strings CS11 to CS21 and CS12 to CS22, control gates of the second string selection transistors SSTb in different rows may be connected to different string selection lines SSL1b and SSL2b, respectively. For example, the second string selection transistors SSTb of the cell strings CS11 and CS12 may be connected in common to the string selection line SSL1b, and the second string selection transistors SSTb of the cell strings CS21 and CS22 may be connected in common to the string selection line SSL2b.

That is, cell strings in different rows may be connected to different string selection lines. String selection transistors, having the same height (or order), of cell strings in the same row may be connected to the same string selection line. String selection transistors, having different heights (or orders), of cell strings in the same row may be connected to different string selection lines.

In exemplary embodiments, string selection transistors of cell strings in the same row may be connected in common to a string selection line. For example, the string selection transistors SSTa and SSTb of the cell strings CS11 and CS12 in the first row may be connected in common to a string selection line, and the string selection transistors SSTa and SSTb of the cell strings CS21 and CS22 in the second row may be connected in common to a string selection line.

Columns of the cell strings CS11 through CS21 and CS12 through CS22 may be connected to different bit lines BL1 and BL2, respectively. For example, the string selection transistors SSTb of the cell strings CS11 and CS21 in the first column may be connected in common to the bit line BL1, and the string selection transistors SSTb of the cell strings CS12 and CS22 in the second column may be connected in common to the bit line BL2.

The cell strings CS11 and CS12 may compose a first plane, and the cell strings CS21 and CS22 may compose a second plane.

In the memory block BLKa, memory cells of each plane placed at the same height may compose a physical page. A physical page may be a unit of writing and reading the memory cells MC1 to MC6. One plane of the memory block BLKa may be selected by the string selection lines SSL1a, SSL1b, SSL2a, and SSL2b. The cell strings CS11 and CS12 in a first plane may be connected to the bit lines BL1 and BL2 when a turn-on voltage is supplied to the string selection lines SSL1a and SSL1b and a turn-off voltage is supplied to the string selection lines SSL2a and SSL2b. That is, the first plane may be selected. The cell strings CS21 and CS22 in a second plane may be connected to the bit lines BL1 and BL2 when the turn-on voltage is supplied to the string selection lines SSL2a and SSL2b and the turn-off voltage is supplied to the string selection lines SSL1a and SSL1b. That is, the second plane may be selected. In a selected plane, a row of memory cells MC1 to MC6 may be selected by the word lines WL1 to WL6. In the selected row, a selection voltage may be applied to the second word line WL2, and a non-selection voltage may be applied to the remaining word lines WL1 and WL3 to WL6. That is, a physical page corresponding to the second word line WL2 of the second plane may be selected by adjusting voltages on the string selection lines SSL1a, SSL1b, SSL2a, and SSL2b and the word lines WL1 to WL6. A write or read operation may be performed with respect to memory cells MC2 in the selected physical page.

In the memory block BLKa, the memory cells MC1 to MC6 may be erased by the memory block or by the sub-block. When erasing is performed by the memory block, all memory cells MC1 to MC6 in the memory block BLKa may be simultaneously erased according to an erase request (e.g., an erase request from an external memory controller). When erasing is performed by the sub-block, a portion of memory cells MC1 to MC6 in the memory block BLKa may be simultaneously erased according to an erase request (e.g., an erase request from an external memory controller), and the other portion of memory cells MC1 to MC6 may be erase-inhibited. A low voltage (e.g., a ground voltage or a low voltage of which the level is similar to that of the ground voltage) may be supplied to a word line connected to erased memory cells MC1 to MC6, and a word line connected to erase-inhibited memory cells MC1 to MC6 may be floated.

The memory block BLKa may include a physical storage space which is distinguished by a block address. Each of the word lines WL1 to WL6 may correspond to a physical storage space which is distinguished by a row address. Each of the bit lines BL1 and BL2 may correspond to a physical storage space which is distinguished by a column address. Each of string selection lines SSL1a and SSL2a or SSL1b and SSL2b in different rows or each of the ground selection lines GSL1 and GSL2 in different rows may correspond to a physical storage space which is identified by a plane address.

The memory block BLKb shown in FIG. 19 is an exemplary. However, the scope and spirit of the inventive concept may not be limited thereto. For example, the number of rows of cell strings may increase or decrease. As the number of rows of cell strings is changed, the number of string or ground selection lines and the number of cell strings connected to a bit line may also be changed.

The number of columns of cell strings may increase or decrease. If the number of columns of cell strings is changed, the number of bit lines connected to columns of cell strings and the number of cell strings connected to a string selection line may also be changed.

A height of the cell strings may increase or decrease. For example, the number of ground selection transistors, memory cells, or string selection transistors that are stacked in each cell string may increase or decrease.

In exemplary embodiments, memory cells MC in a physical page may correspond to at least three logical pages. For example, k bits (k being an integer of 2 or more) may be programmed in a memory cell MC. In memory cells MC of one physical page, k logical pages may be implemented with k bits programmed in each memory cell MC.

For example, a physical page may include a physical storage space which is distinguished by a block address, a row address, a column address, and a plane address. One physical page may include two or more logical pages. Each of the logical pages may include a logical storage space which is distinguished by an additional address (or an offset) for identifying logical pages as well as an address of a physical page.

In an exemplary embodiment, a three dimensional (3D) memory array is provided. The 3D memory array is monolithically formed in one or more physical levels of arrays of memory cells having an active area disposed above a silicon substrate and circuitry associated with the operation of those memory cells, and the circuitry may be located above or within the substrate. The term "monolithic" means that layers of each level of the array are directly deposited on the layers of each underlying level of the array.

In an exemplary embodiment, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and U.S. Pat. Pub. No. 2011/0233648.

Figure 20:
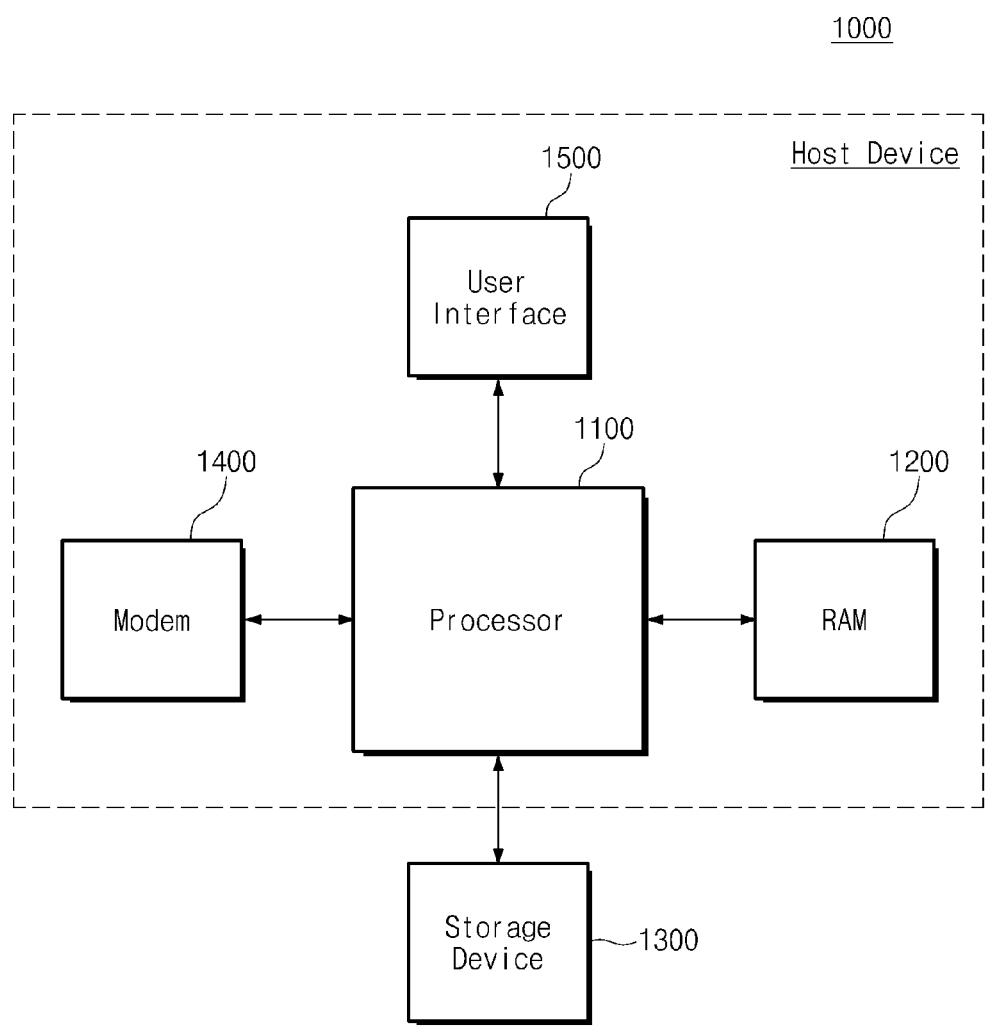
FIG. 20 is a block diagram schematically illustrating a computing device according to an exemplary embodiment.

FIG. 20 is a block diagram schematically illustrating a computing device 1000 according to an exemplary embodiment. Referring to FIG. 20, a computing device 1000 may include a processor 1100, a RAM 1200, a storage device 1300, a modem 1400, and a user interface 1500.

The processor 1100 may control an overall operation of the computing device 1000 and perform a logical operation. The processor 1100 may be a data processing device which is based on a hardware including a circuit physically configured to execute operations expressed by commands included in a code or program. For example, the processor 1100 may be a system-on-chip (SoC). The processor 1100 may be a general purpose processor, a specific-purpose processor, or an application processor.

The RAM 1200 may communicate with the processor 1100. The RAM 1200 may be a main memory of the processor 1100 or the computing device 1000. The processor 1100 may store codes or data at the RAM 1200 temporarily. The processor 1100 may execute codes using the RAM 1200 and process data. The processor 1100 may execute a variety of software, such as, but not limited thereto, an operating system and an application, using the RAM 1200. The processor 1100 may control an overall operation of the computing device 1000 using the RAM 1200. The RAM 1200 may include a volatile memory such as, but not limited thereto, an SRAM, a DRAM, a SDRAM, and the like or a nonvolatile memory such as, but not limited thereto, a PRAM, an MRAM, an RRAM, an FRAM, and the like.

The storage device 1300 may communicate with the processor 1100. The storage device 1300 may be used to store data for a long time. That is, the processor 110 may store data, which is to be stored for a long time, at the storage device 1300. The storage device 1300 may store a boot image for driving the computing device 1000, store source codes of a variety of software, such as an operating system and an application, and store data that is processed by the variety of software.

The processor 1100 may load source codes stored at the storage device 1300 onto the RAM 1200 and execute the codes, thereby driving the variety of software. The processor 1100 may load data stored at the storage device 1300 onto the RAM 1200 and process data loaded onto the RAM 1200.

The processor 1100 may store long-term data among data, stored at the RAM 1200, at the storage device 1300.

The storage device 1300 may include a nonvolatile memory, such as, but not limited thereto, a flash memory, a PRAM, an MRAM, an RRAM, an FRAM, and the like.

The modem 1400 may communicate with an external device under a control of the processor 1100. For example, the modem 1400 may communicate with the external device in a wired or wireless manner. The modem 1400 may communicate with the external device, based on at least one of wireless communications manners, such as long term evolution (LTE), Worldwide Interoperability for Microwave Access (WiMax), global system for mobile communication (GSM), code division multiple access (CDMA), Bluetooth, near field communication (NFC), Wi-Fi, radio frequency identification (RFID), and the like or wired communications manners, such as universal serial bus (USB), Serial ATA (SATA), High-Speed Inter-Chip (HSIC), Small Computer System Interface (SCSI), Firewire, peripheral component interconnection (PCI), PCI express (PCIe), nonvolatile memory express (NVMe), universal flash storage (UFS), secure digital (SD), Secure Digital Input Output (SDIO), universal asynchronous receiver transmitter (UART), serial peripheral interface (SPI), high speed SPI (HS-SPI), RS232, inter-integrated circuit (I2C), HS-I2C, integrated-interchip sound (I2S), Sony/Philips digital interface (S/PDIF), multimedia card (MMC), embedded MMC (eMMC), and so on.

The user interface 1500 may communicate with a user under a control of the processor 1100. For example, the user interface 1500 may include user input interfaces, such as a keyboard, a keypad, buttons, a touch panel, a touch screen, a touch pad, a touch ball, a camera, a microphone, a gyroscope sensor, a vibration sensor, and the like. The user interface 1500 may further include user output interfaces, such as a liquid crystal display (LCD), an organic light-emitting diode (OLED) display device, an active matrix OLED (AMOLED) display device, a light-emitting diode (LED), a speaker, a motor, and the like.

The storage device 1300 may include one of the storage devices according to an exemplary embodiment. The processor 1100, RAM 1200, modem 1400, and user interface 1500 may constitute a host device that communicates with the storage device 1300.

According to an exemplary embodiment, map data with a first size may be replaced with cache map data with a second size smaller than the first size, thereby reducing the number of events that map data is read from a nonvolatile memory device and improving the speed of a storage device.

At least one of the components, elements, modules or units represented by a block as illustrated in FIGS. 1, 18, and 20 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

While the inventive concept has been described with reference to exemplary embodiments, it will be apparent to those skilled in the art that various changes and modifications may be made from the foregoing descriptions without departing from the spirit and scope of the inventive concept. Therefore, it should be understood that the above exemplary embodiments are not limiting, but illustrative. Thus, the scopes of the inventive concept are to be determined by the broadest permissible interpretation of the following claims and their equivalents, and shall not be restricted or limited by the foregoing description.

What is claimed is:

1. A storage device comprising:
   a nonvolatile memory device; and
   a controller configured to control a read operation of the nonvolatile memory device according to a read request from an external host device,
   wherein the controller is configured to read map data including a segment, store different types of map data in an internal random access memory (RAM) based on determining whether the segment corresponds to sequential data, and generate cache map data indicating that the segment corresponds to the sequential data to store the cache map data, if the segment corresponds to the sequential data.

2. The storage device of claim 1, wherein the controller is configured to receive the read request based on logical addresses, convert the logical addresses into physical addresses of the nonvolatile memory device, and control the read operation based on the converted physical addresses.

3. The storage device of claim 2, wherein the controller is configured to read the map data including the segment corresponding to the logical addresses.

4. The storage device of claim 1, wherein the controller is configured to store partial map data, associating logical addresses with physical addresses of the segment, among the map data, if the segment does not correspond to the sequential data.

5. The storage device of claim 4, wherein the cache map data comprises information about a start physical address of the segment and a start logical address related to the start physical address.

6. The storage device of claim 4, wherein the controller is configured to convert, if cache map data corresponding to the logical addresses is stored in the internal RAM, the logical addresses into the physical addresses using the cache map data stored in the internal RAM.

7. The storage device of claim 6, wherein the controller is configured to determine whether cache map data corresponding to the logical addresses is stored in the internal RAM based on a set associative cache.

8. The storage device of claim 4, wherein the controller is configured to store, in the internal RAM, cache map data indicating that a first segment corresponding to the logical addresses corresponds to sequential data, if the first segment corresponds to the sequential data and to store cache map data indicating that a second segment which is smaller than the first segment and corresponds to the logical addresses corresponds to sequential data, if the first segment does not correspond to sequential data and the second segment corresponds to sequential data.

9. The storage device of claim 8, wherein a size of the first segment and a size of the second segment are determined according to operating characteristics of the controller and the nonvolatile memory device.

10. The storage device of claim 8, wherein a size of the first segment and a size of the second segment are determined according to operating characteristics of the controller and the external host device.

11. The storage device of claim 4, wherein the segment comprises a plurality of entries, and
wherein each of the plurality of entries comprises conversion information between a logical address and a physical address.

12. The storage device of claim 11, wherein the cache map data comprises a start entry of the segment, and
wherein the partial map data comprises entries corresponding to the logical addresses.

13. The storage device of claim 12, wherein the start entry further comprises a cache tag indicating that the segment corresponds to sequential data.

14. The storage device of claim 1, wherein the nonvolatile memory device comprises a plurality of memory blocks,
wherein each of the plurality of memory blocks comprises a plurality of cell strings arranged on a substrate,
wherein each of the plurality of cell strings comprises at least one selection transistor and a plurality of memory cells stacked on the substrate in a direction perpendicular to the substrate, and
wherein each of the at least one selection transistor and the plurality of memory cells comprises a charge trap layer.

15. A storage device comprising:
a nonvolatile memory device; and
a controller configured to control a write operation of the nonvolatile memory device according to a write request from an external host device,
wherein the controller is configured to generate map data, to store the generated map data as different types of map data in an internal random access memory (RAM) based on determining whether write data is sequential, to write the generated map data and the write data corresponding to the write request in the nonvolatile memory device, and to generate cache map data indicating that the write data is sequential to store the cache map data, if a range in which the logical addresses of the write data are continuous is greater than or equal to a segment corresponding to the cache map data.

16. The storage device of claim 15, wherein the controller is configured to receive the write request based on logical addresses, convert the logical addresses into physical addresses of the nonvolatile memory device, and control the write operation based on the converted physical addresses.

17. The storage device of claim 16, wherein the controller is configured to generate the map data including conversion information between the logical addresses and the physical addresses.

18. The storage device of claim 15, wherein the controller is configured to store map data associating logical addresses with physical addresses of the write data as partial map data, if a range in which the logical addresses of the write data are continuous is smaller than the segment.

19. A method of operating a storage device which includes a nonvolatile memory device and a controller configured to control the nonvolatile memory device, the method comprising:
receiving a write request from an external host device;
generating map data for associating logical addresses corresponding to the write request with physical addresses of the nonvolatile memory device;
generating cache map data corresponding to at least one segment if a range in which the logical addresses are continuous is greater than or equal to the at least one segment; and
storing the cache map data in an internal random access memory (RAM) of the controller, if the range in which the logical addresses are continuous is greater than or equal to the at least one segment.

20. The method of claim 19, further comprising:
storing the generated map data as partial map data in the internal RAM of the controller, if a range in which the logical addresses are continuous is smaller than the at least one segment.

* * * * *